US008022667B2

(12) United States Patent  (10) Patent No.: US 8,022,667 B2
Anderson  (45) Date of Patent: Sep. 20, 2011

(54) ELECTRIC VEHICLE CHARGING SYSTEM

(76) Inventor: Lawrence Everett Anderson, Arlington, VA (US)

( * ) Notice: Subject to any disclaimer, the term of this patent is extended or adjusted under 35 U.S.C. 154(b) by 0 days.

(21) Appl. No.: 13/020,800

(22) Filed: Feb. 3, 2011

(65) Prior Publication Data

US 2011/0127946 A1    Jun. 2, 2011

(51) Int. Cl.
*H02J 7/00* (2006.01)
(52) U.S. Cl. .................. 320/109; 320/101; 320/104
(58) Field of Classification Search .............. 320/109
See application file for complete search history.

(56) References Cited

U.S. PATENT DOCUMENTS

| 3,876,925 | A | | 4/1975 | Stoeckert |
| 5,461,298 | A | * | 10/1995 | Lara et al. ............... 320/109 |
| 5,462,439 | A | * | 10/1995 | Keith ....................... 320/109 |
| 5,572,109 | A | * | 11/1996 | Keith ....................... 320/109 |
| 5,629,603 | A | * | 5/1997 | Kinoshita ................ 180/65.8 |
| 6,590,363 | B2 | * | 7/2003 | Teramoto ................. 320/101 |
| 7,731,383 | B2 | | 6/2010 | Myer |
| 2006/0149607 | A1 | | 7/2006 | Sayers |
| 2008/0150286 | A1 | * | 6/2008 | Fein et al. ................. 290/44 |
| 2010/0029268 | A1 | | 2/2010 | Myers et al. |
| 2010/0225266 | A1 | * | 9/2010 | Hartman ................... 320/101 |

* cited by examiner

*Primary Examiner* — Edward Tso
*Assistant Examiner* — Johali Torres Ruiz

(57) ABSTRACT

A method and system for connecting a vehicle to a charging source comprising: at least one retractable protrusion operatively connected to a battery terminal; the at least one retractable protrusion being mounted on the vehicle; at least one receptacle operatively connected to the charging source adapted to receive the retractable protrusion for electrical connection of a vehicle to a charging source; whereby by driving the vehicle in the proximity of the at least one receptacle, the charging source is connected to the electrical system of the vehicle as the retractable protrusion engages the at least one receptacle. Another embodiment comprises at least one solar element for converting solar power to electric power; at least one battery for storing electricity generated by the solar element; the solar element being operatively connected to the at least one battery for storing electric power therein; first and second vehicle based connectors for connecting the vehicle power supply to the charging system, the first and second vehicle based connectors being located on the periphery of the vehicle such that the vehicle may be connected to the vehicle charging system by alignment of the vehicle with first and second external connectors operatively associated with the external charging system; whereby by maneuvering the vehicle, the first and second vehicle based connectors are bought into contact with the first and second external connectors to enable charging of the vehicle battery.

20 Claims, 31 Drawing Sheets

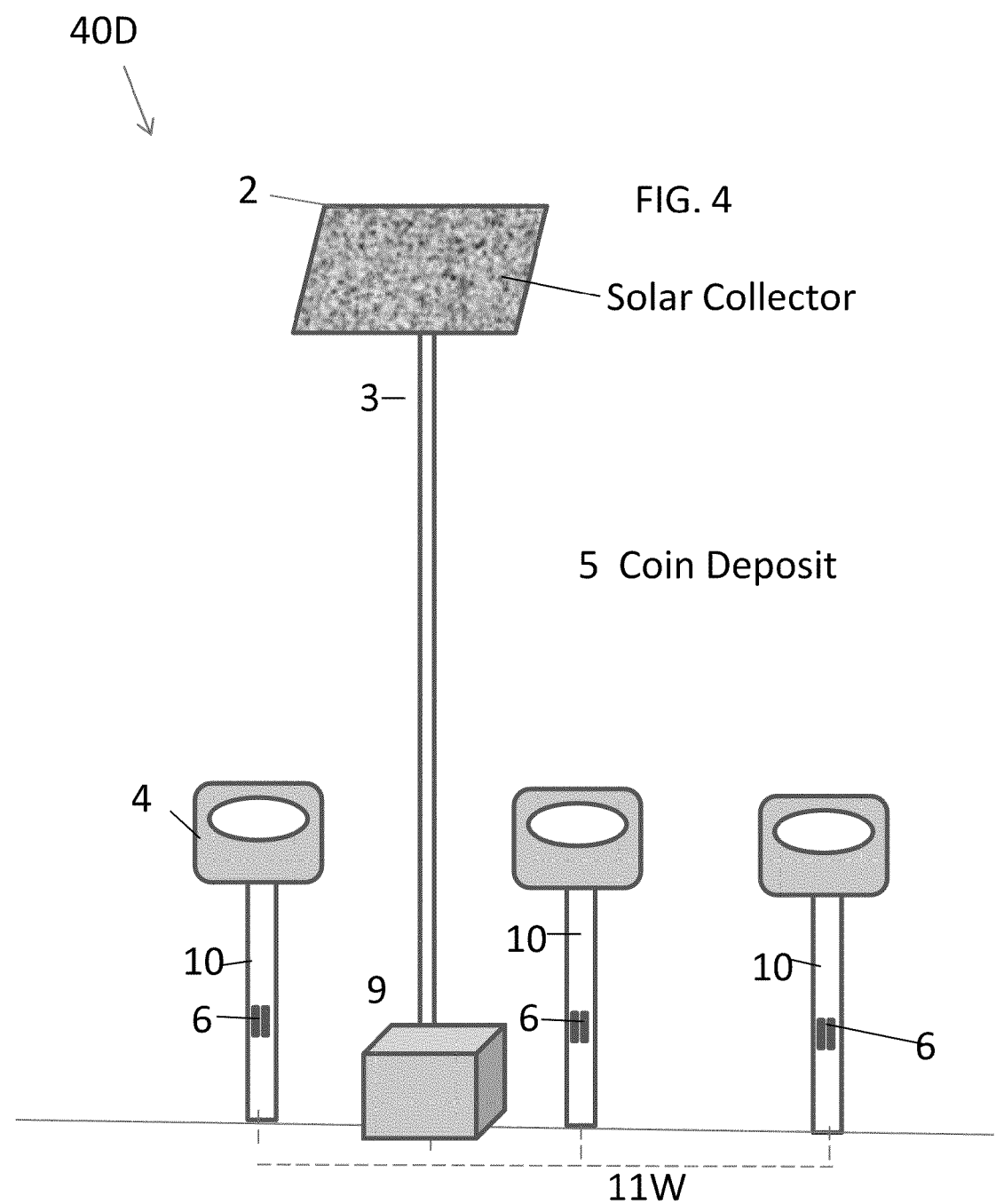

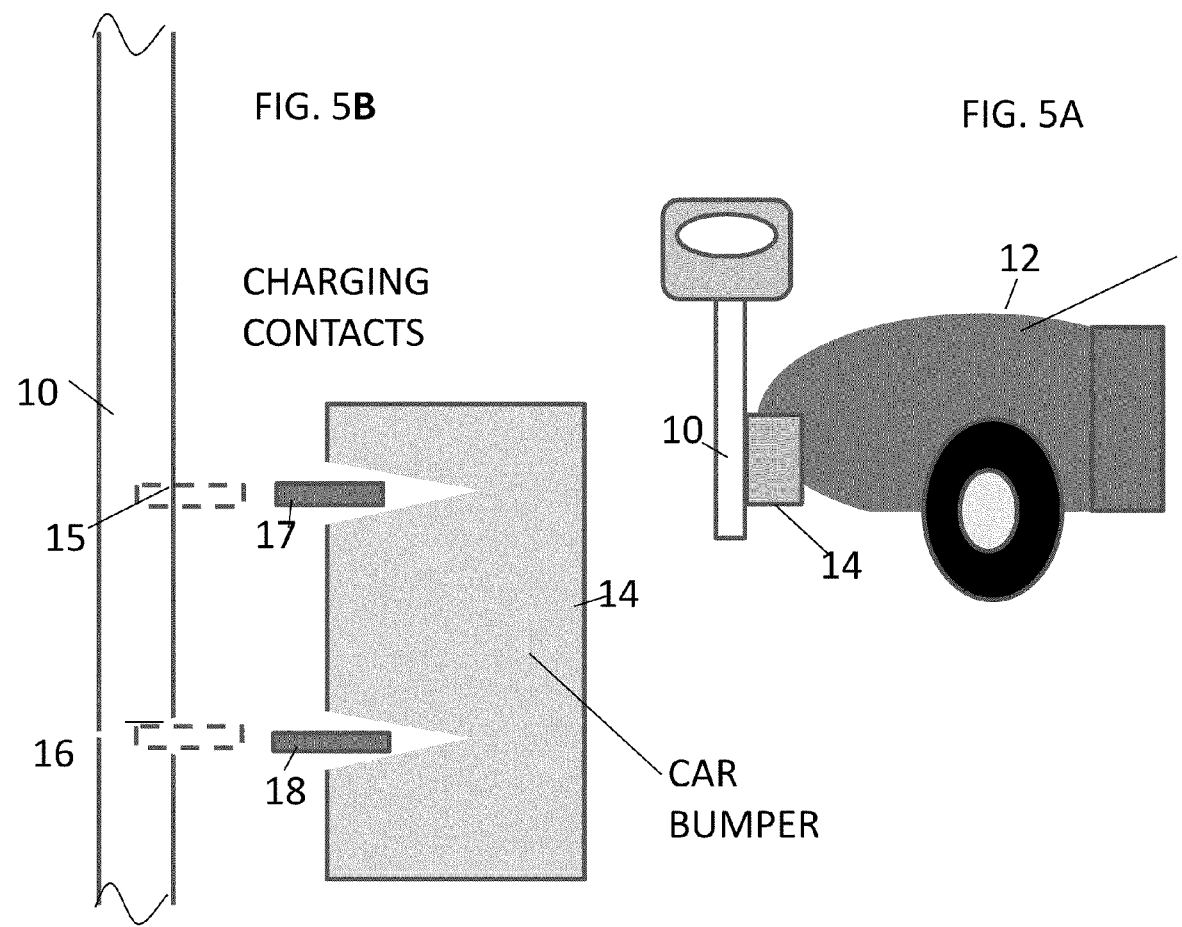

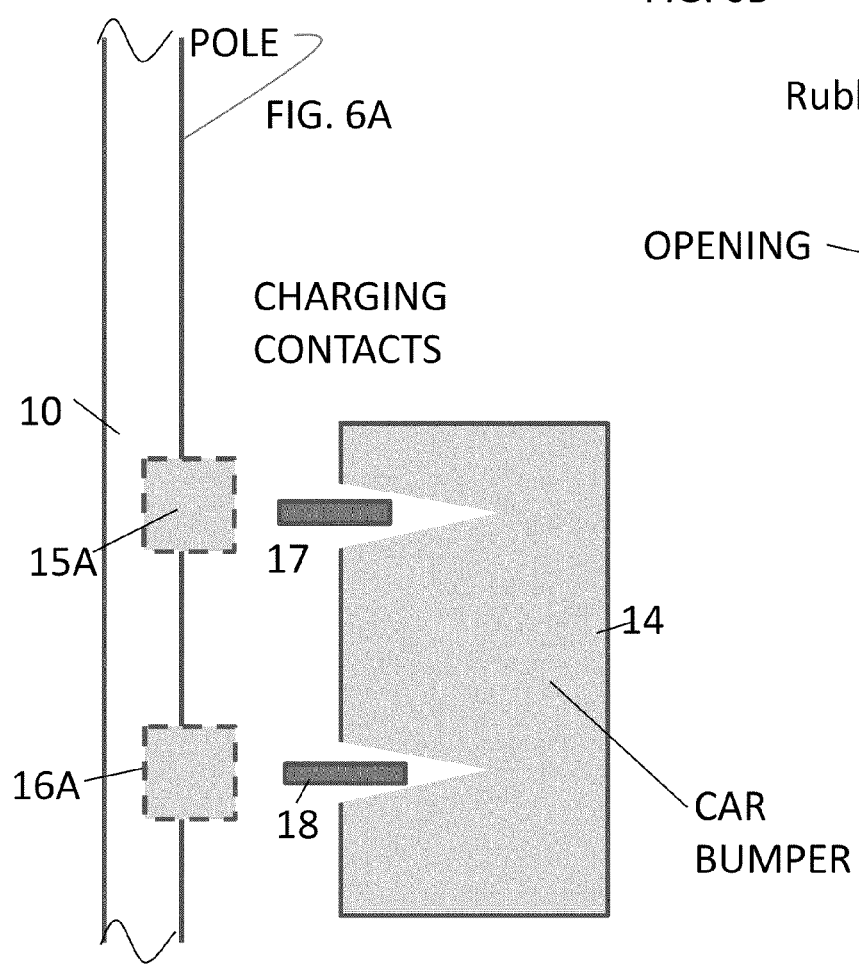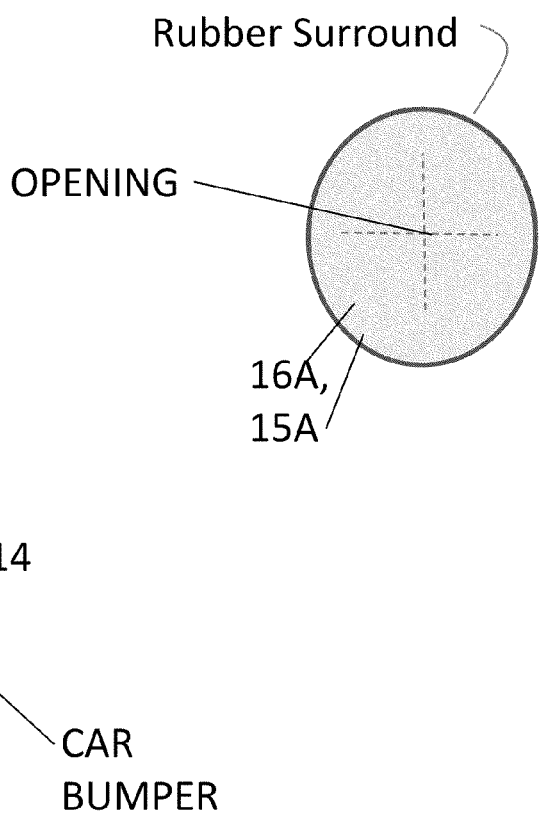

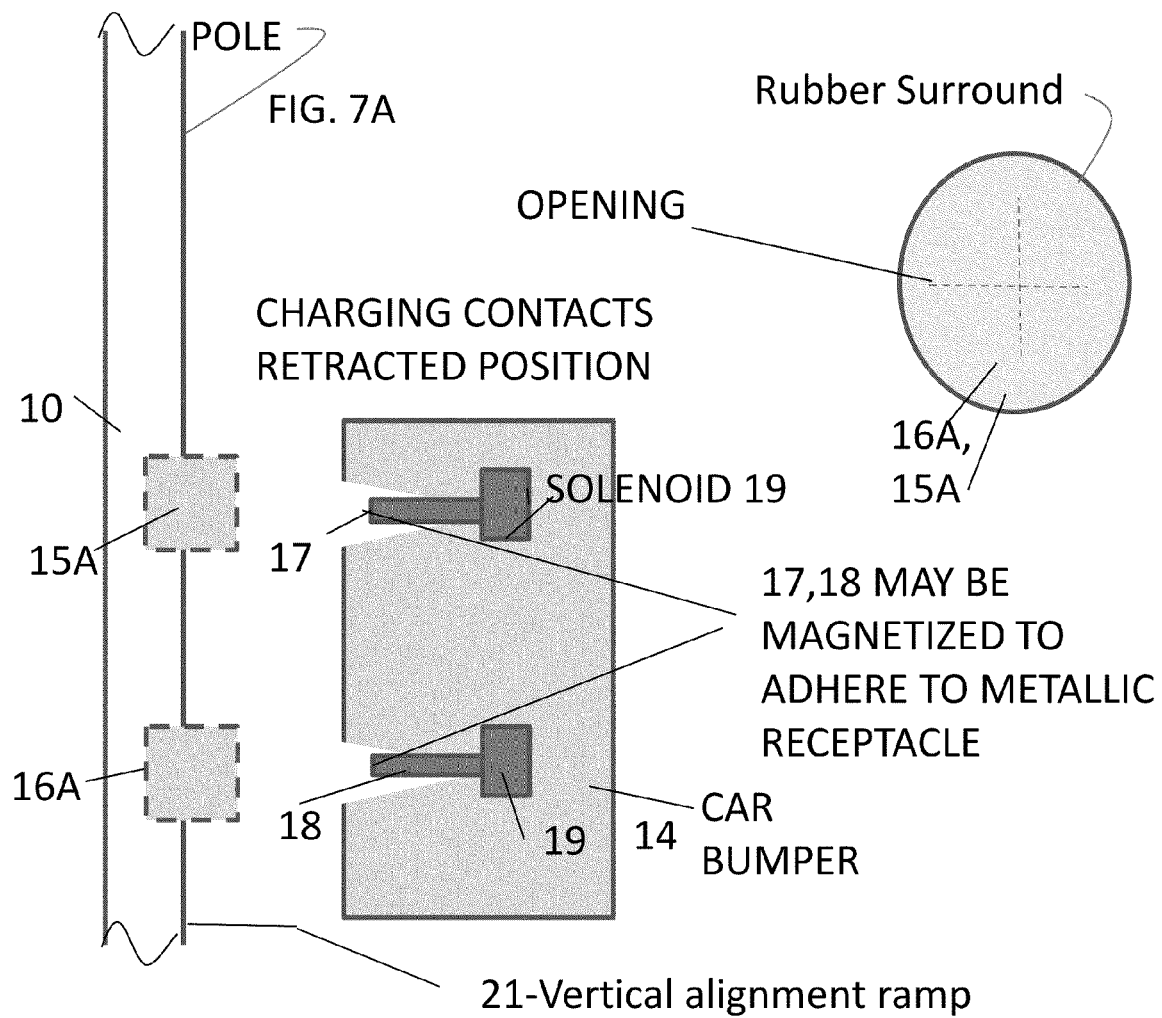

Rubber Surround
OPENING

CHARGING CONTACTS
RETRACTED POSITION

21-Vertical alignment ramp

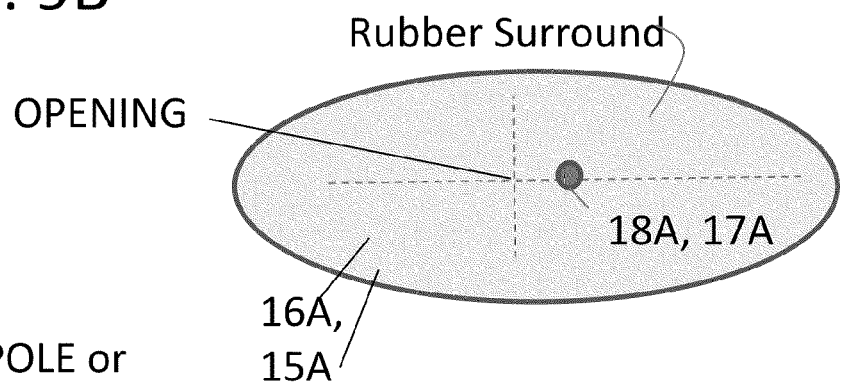
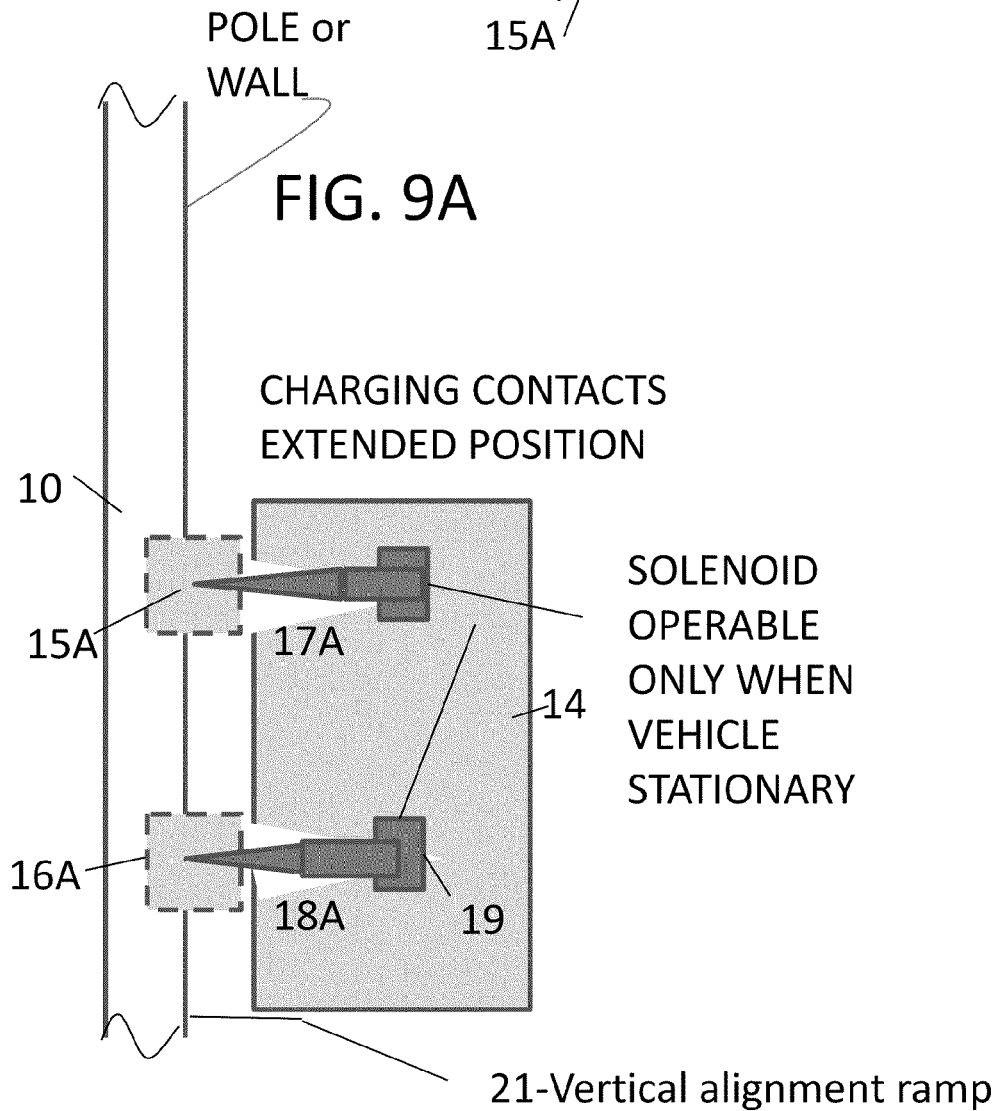

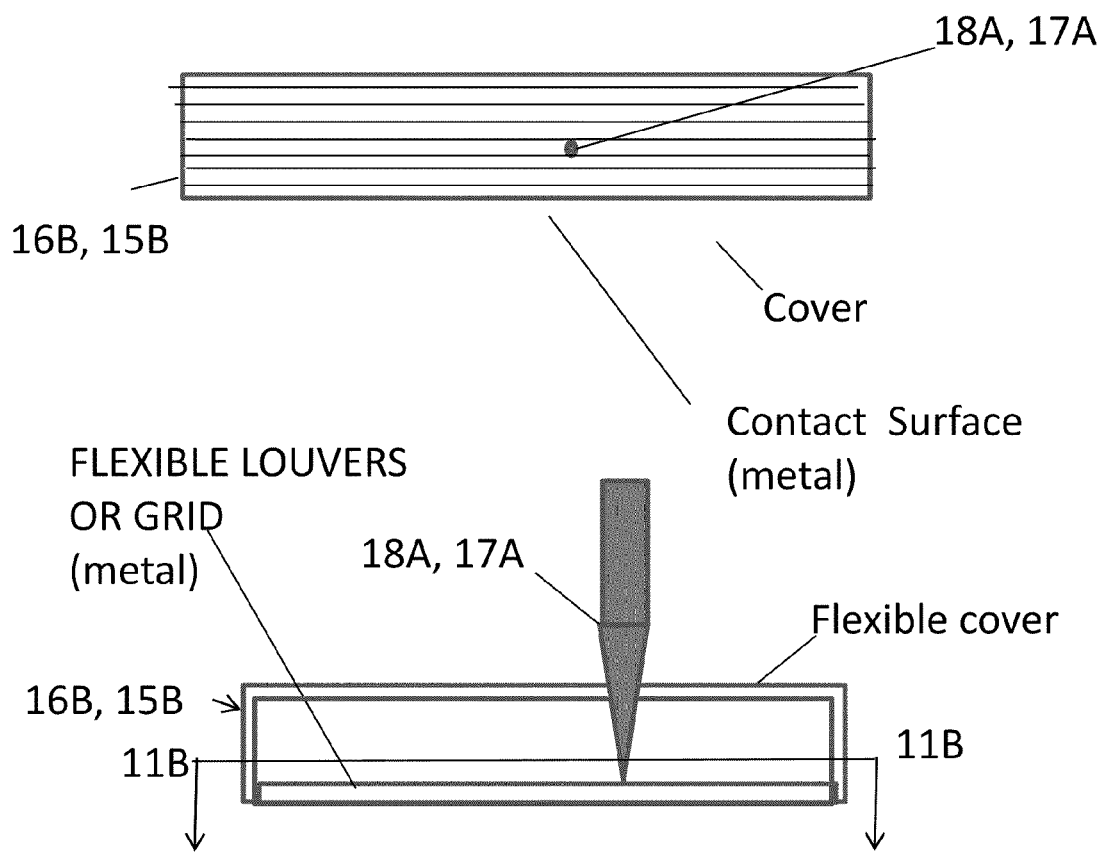

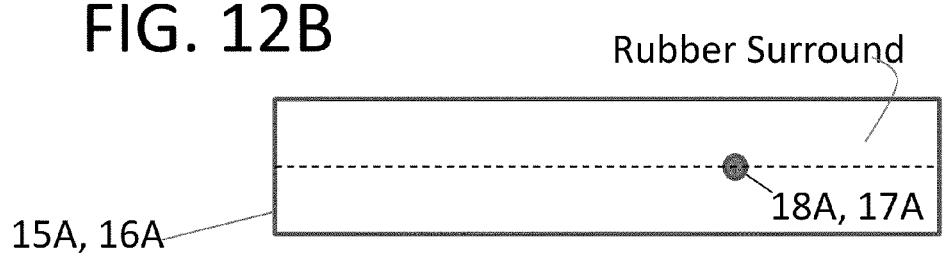
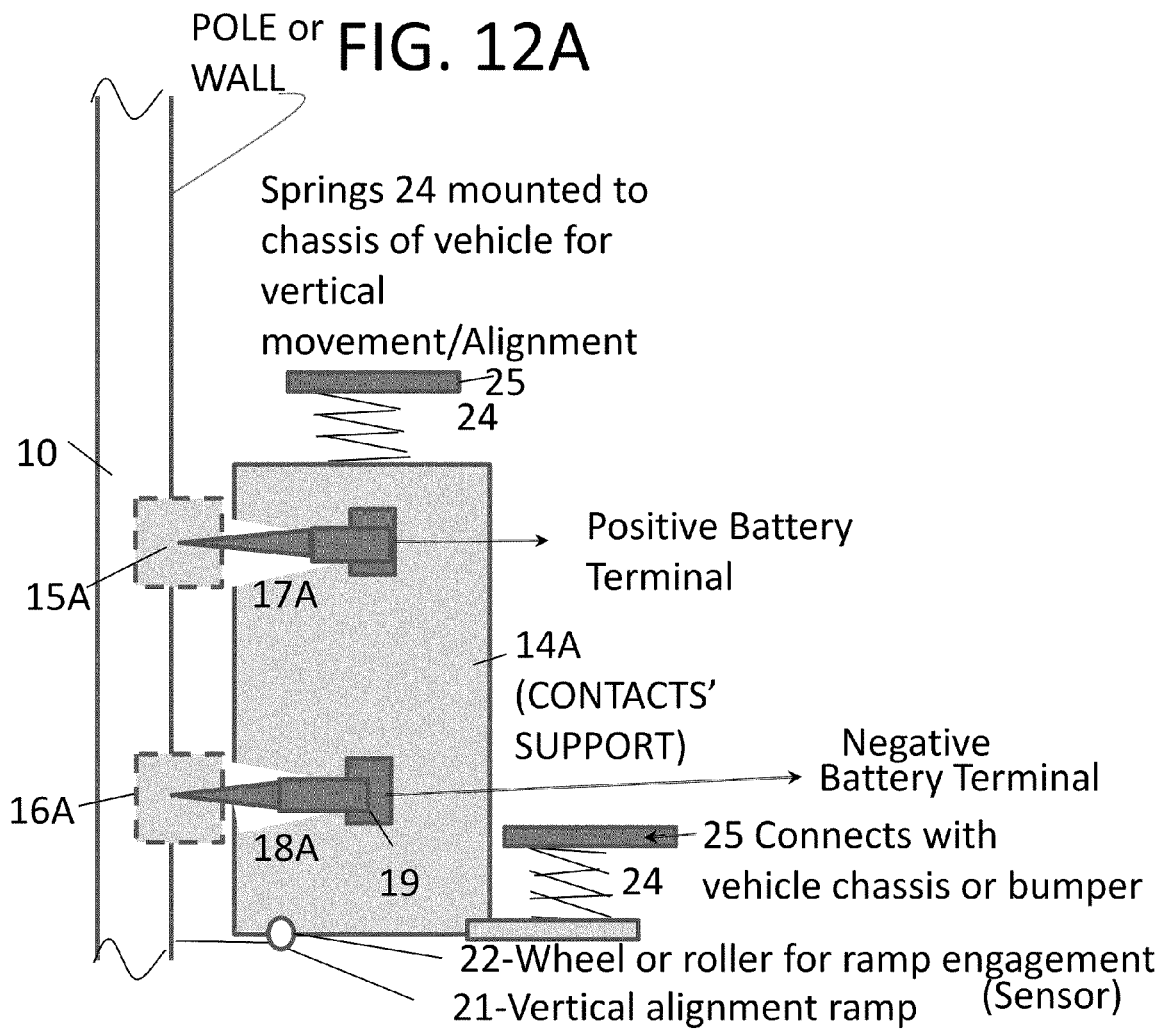

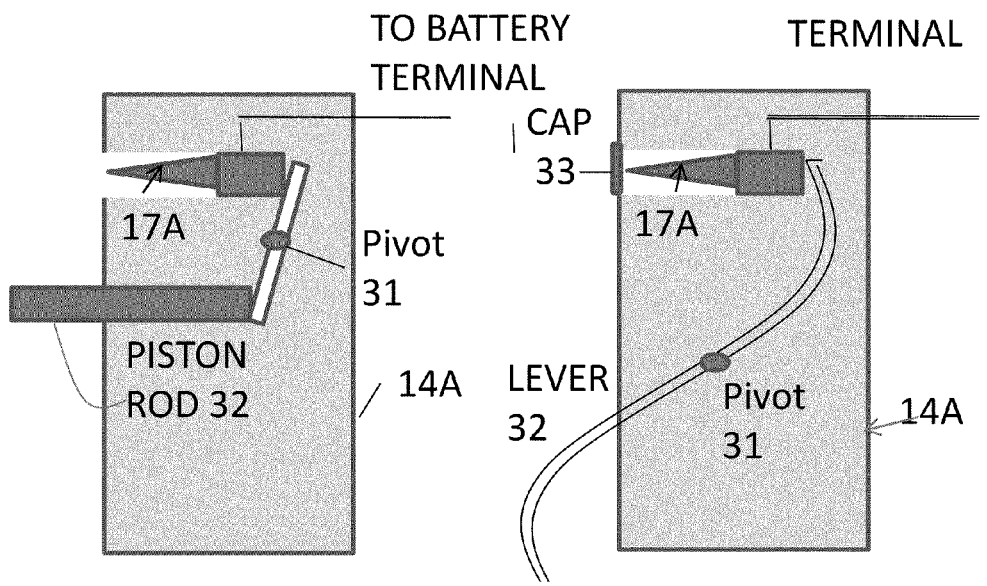

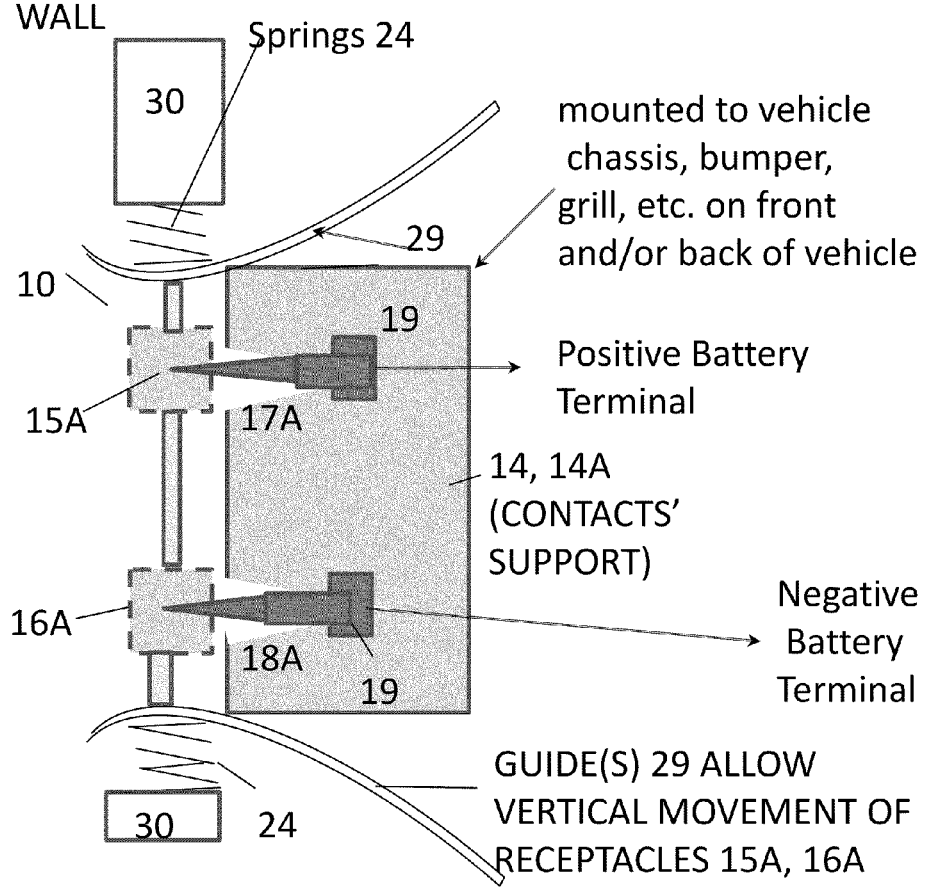

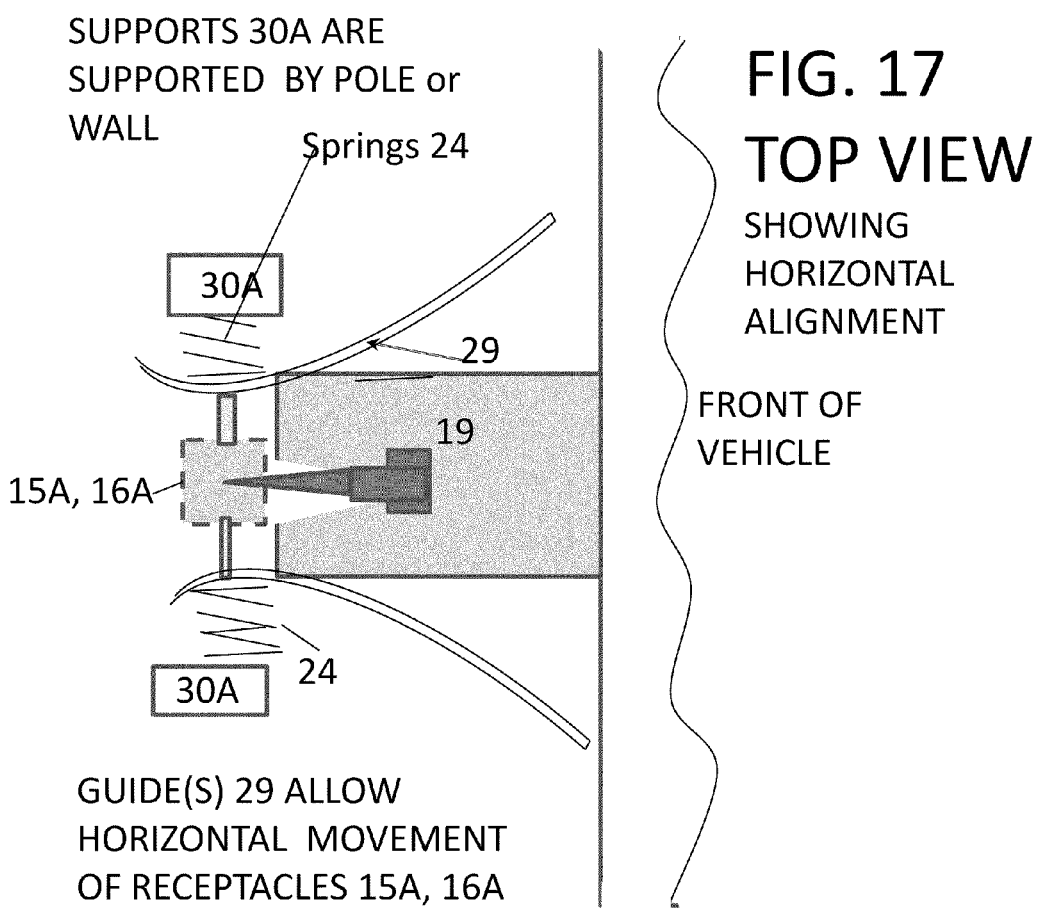

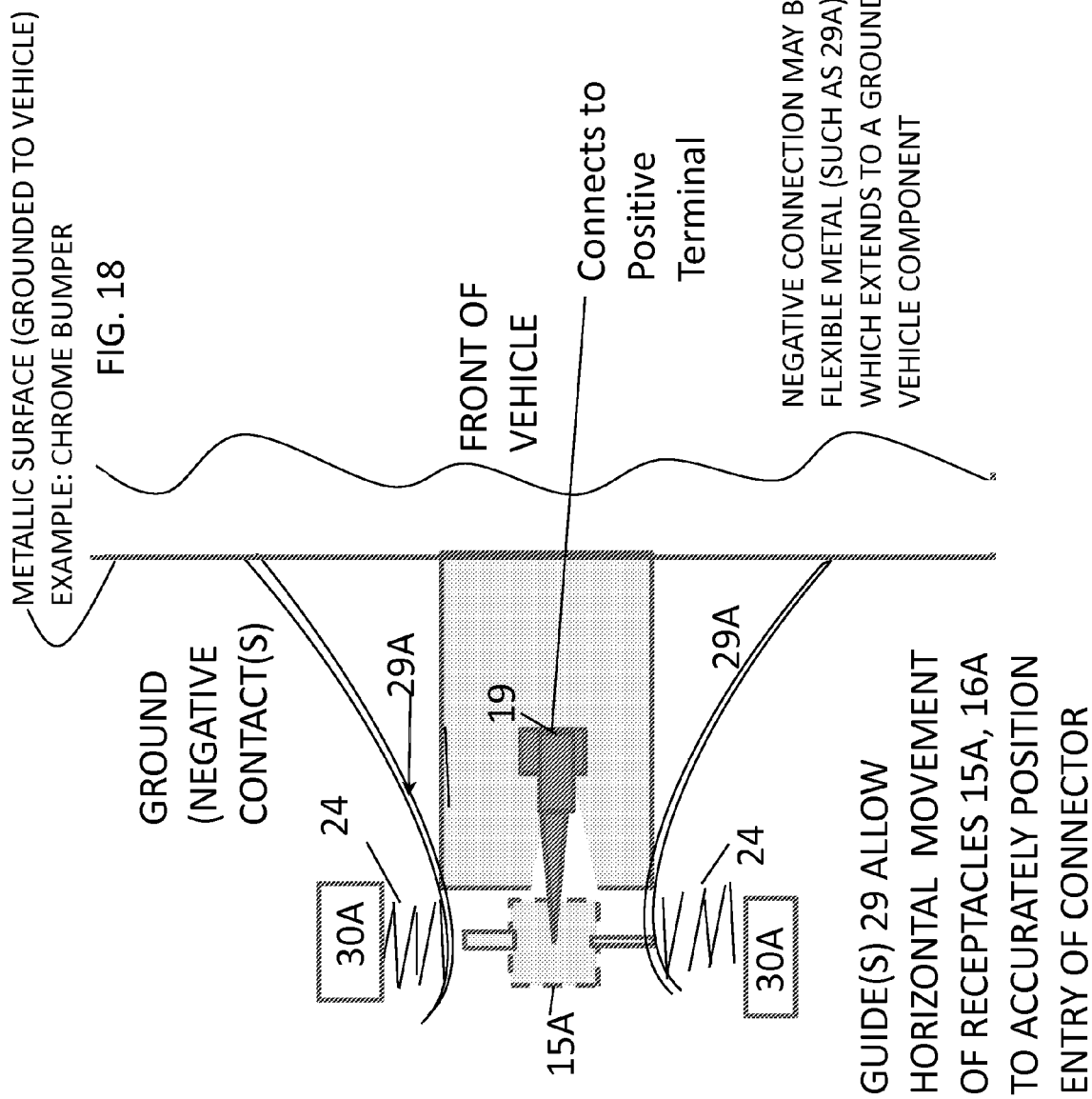

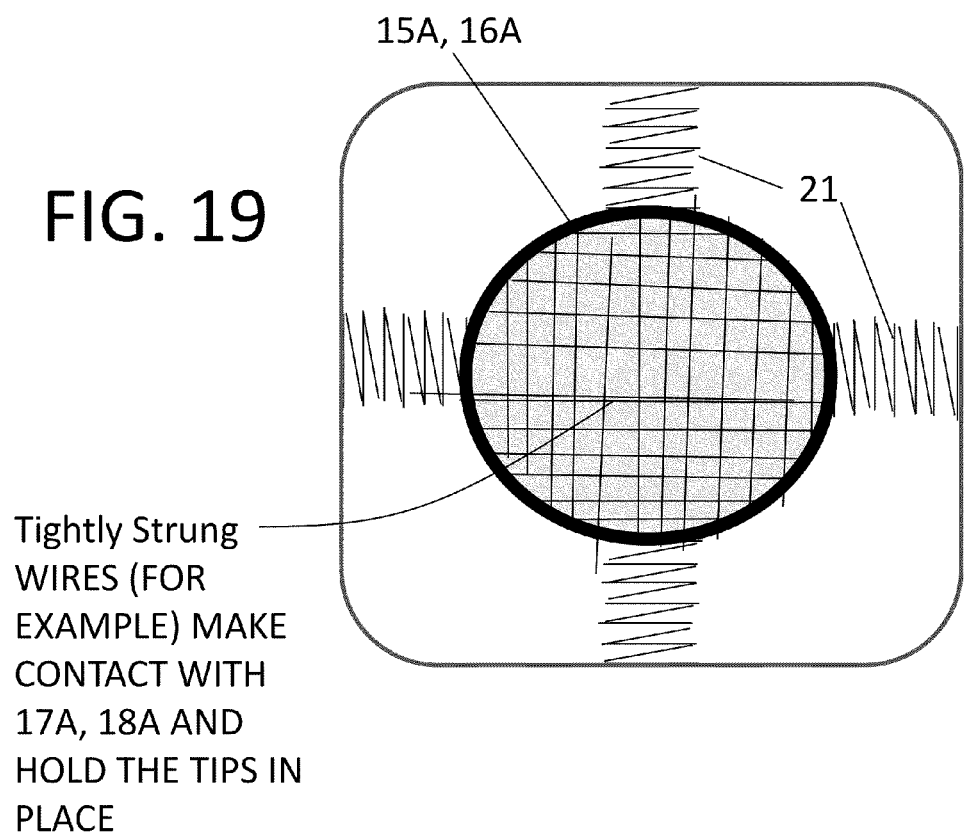

15A, 16A

21

41

Cavity 40 receptacle

18A

18A

41

ELECTRO MAGNETS/ SENSOR

PANELS FOLD INTO
ROOF WHEN CAR IS
NOT PARKED
FIG. 24B
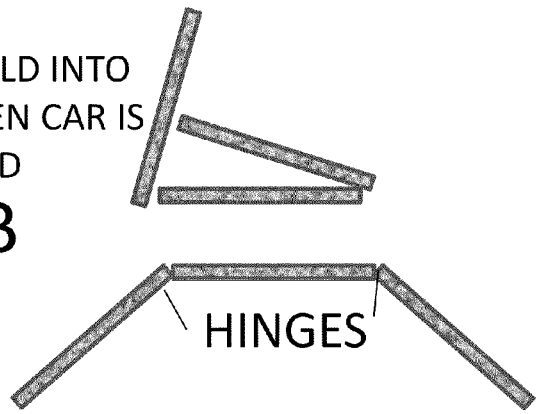
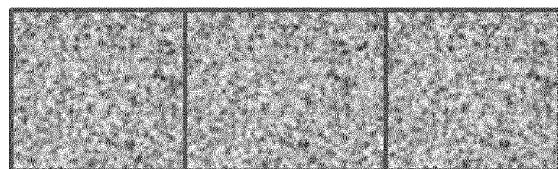
HINGES
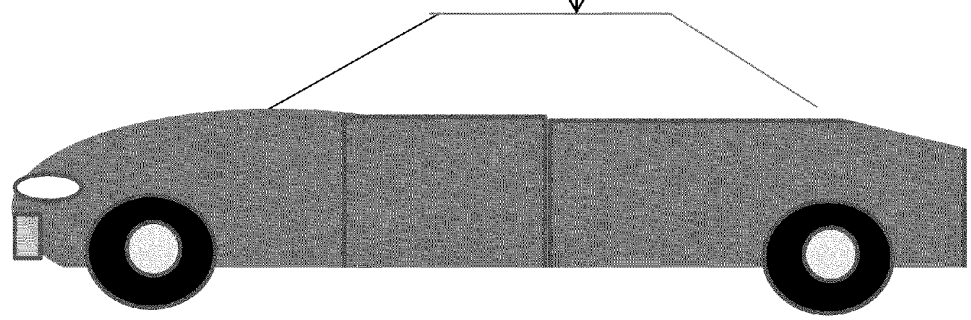
FIG. 24A

US 8,022,667 B2

ELECTRIC VEHICLE CHARGING SYSTEM

RELATED APPLICATIONS

This application claims priority and is a continuation in part of U.S. application Ser. No. 12/860,876 filed Aug. 21, 2010, through which priority is claimed to U.S. Pat. No. 7,789,524, filed Aug. 5, 2009, entitled Solar or Wind Powered Light, which issued as a patent on Sep. 7, 2010.

FIELD OF THE INVENTION

The present invention is directed to an assembly for facilitating the charging of an electric vehicle or the like.

BACKGROUND OF THE INVENTION

The 2011 Chevy Volt, primarily an electric (or hybrid) vehicle is advertised as requiring 10 to 12 hours of charging at 110 volts. If the charging current is between 15-30 amperes of current @ 110 volts, the power is on the order of 1650 to 3300 watts per hour. If the charge is 10-12 hours, one can multiply by the number of hours to produce the kilowatt hours. While charging is available to some people in their homes/garages, it presents a problem to apartment dwellers and to people who do not have access to a charging system. Accordingly, making charging systems available through parking meters or charging stations is highly desirable.

Remote power stations may be useful to supplement or as an alternative to the home recharging concept. Solar power does not require the installation of power lines for supply of power to remote charging stations.

Background solar powered devices include U.S. patent application Ser. No. 12/025,737 entitled "SOLAR-POWERED LIGHT POLE AND LED LIGHT FIXTURE," hereby incorporated by reference, which discloses a solar-powered lighting system that includes a flexible, wrap-around, preferably self-stick panel of photovoltaic laminate applied to the outside surface of a light pole. An LED light fixture is connected preferably at or near the top of the pole and has the same or similar diameter as the pole. The LED light fixture has multiple columns and rows of LEDs and an interior axial space for air flow to cool the LEDs. The pole preferably also has vents and axial passage(s) for creating a natural updraft through at least a portion of the pole and the light fixture, for cooling of the photovoltaic panel interior surface, the LEDs, and/or other equipment inside the fixture or pole, and batteries that may be provided inside the pole or pole base.

U.S. Patent Application No. 2006/0149607, hereby incorporated by reference, discloses means for programming and controlling an LED assembly using a programmable controller and feedback means.

Interconnection of the charging source, whether it be a solar powered charging source or convention power lines, can be hazardous when requiring a individual to get out of the driver's seat to plug a cord from the power supply into the car receptacle or vice versa. This is particularly disadvantageous in bad weather.

SUMMARY OF THE PRESENT INVENTION

Embodiments of the present invention include assemblies for use both with home charging systems and remote charging systems. The assemblies may be powered by conventional power lines or may be solar powered.

A preferred embodiment utilizes a hands-free method for interconnection of the charging source to the power system of the vehicle. The preferred embodiment of the assembly may be mounted to the front or back of the vehicle such that the vehicle may be driven into a position in which a retractable protrusion engages a receptacle to create an electrical connection between the charging source and the vehicle power system. One or both of the retractable protrusion or at least one receptacle may be adjustable mounted to provide adjustment. The adjustment may occur through the use of guides which guide the entry of the at least one retractable protrusion into the receptacle without requiring the operator to leave the car to position either of the retractable protrusion or the receptacle using his or her hands.

As claimed in claim 1, An assembly for connecting a vehicle to a charging source comprising at least one retractable protrusion operatively connected to a battery terminal; the at least one retractable protrusion being mounted on the vehicle; at least one receptacle operatively connected to the charging source adapted to receive the retractable protrusion for electrical connection of a vehicle to a charging source; whereby by driving the vehicle in the proximity of the at least one receptacle, the charging source is connected to the electrical system of the vehicle as the retractable protrusion engages the at least one receptacle.

Another embodiment comprises at least one solar element for converting solar power to electric power; at least one battery for storing electricity generated by the solar element; the solar element being operatively connected to the at least one battery for storing electric power therein; first and second vehicle based connectors for connecting the vehicle power supply to the charging system, the first and second vehicle based connectors being located on the periphery of the vehicle such that the vehicle may be connected to the vehicle charging system by alignment of the vehicle with first and second external connectors operatively associated with the external charging system; whereby by maneuvering the vehicle, the first and second vehicle based connectors are bought into contact with the first and second external connectors to enable charging of the vehicle battery.

BRIEF DESCRIPTION OF THE DRAWINGS

These and/or other aspects and advantages of the invention will become apparent and more readily appreciated from the following description of the embodiments, taken in conjunction with the accompanying drawings of which: The drawings of this invention are illustrative and diagrammatic in nature in order to present the principles of the invention. They are being provided as examples without limiting the invention to the specific configuration or dimensions shown.

FIG. 4 is a schematic illustration showing a view of a preferred embodiment assembly of the present invention comprising a solar collector 2, panel support 3, central portions 4 (optionally comprising a meter for measurement of electricity transferred (dispensed)), plug (receptacle) connectors 6, and supports 10.

FIG. 5A is a schematic illustration showing a view of a preferred embodiment assembly of the present invention comprising a car 12 and a car bumper section or portion 14, support 10 for a meter (details of which are not shown).

FIG. 5B is a schematic illustration showing a close-up view of a preferred embodiment assembly of the present invention comprising a car bumper section or portion 14, support 10, receptacle portions 15, 16, ad protruding connector portions 17, 18, FIG. 6A is a schematic illustration showing a close-up view of a preferred embodiment assembly of the present invention comprising a car bumper section or portion 14, support 10, receptacle portions 15A, 16A, ad protruding connector portions 17, 18.

FIG. 6B is a close up schematic view of the receptacles 15A, 16A comprising a cover (such as for example, a rubber or plastic cover or surround) having slits or openings into which the connectors 17, 18 may be inserted.

FIG. 7A is a schematic illustration showing a close-up view of a preferred embodiment assembly of the present invention comprising a car bumper section or portion 14, support 10, receptacle portions 15A, 16A, ad protruding connector portions 17, 18 which are mounted in solenoids 19 (shown in retracted position in FIG. 7A), The connector portions 17,18 may be magnetized to facilitate attachment to the metallic portions of receptacles 15A and 16A.

FIG. 7B is a close up schematic view of the receptacles 15A, 16A comprising a cover (such as for example, a rubber or plastic cover) having slits or openings into which the connectors 17, 18 may be inserted.

FIG. 9A is a schematic illustration showing a close-up view of a preferred embodiment assembly of the present invention comprising a car bumper section or portion 14, support 10, receptacle portions 15A, 16A, ad protruding connector portions 17A, 18A (which may be substantially pointed) (shown in EXTENDED position in FIG. 9A) which are mounted in solenoids 19, which optionally may be operable only when the car is stationary or moving at a very slow speed. The connector portions 17A,18A may be magnetized to facilitate attachment to the metallic portions of receptacles 15A and 16A.

FIG. 9B is a close up schematic view of the receptacles 15A, 16A comprising a cover (such as for example, a rubber or plastic cover/surround) having slits or openings into which the connectors 17A, 18A may be inserted.

FIG. 11A is a close up schematic view of the receptacles 15B, 16B comprising a cover (such as for example, a rubber or plastic cover/surround) having slits or openings into which the connectors 17A, 18A may be inserted.

FIG. 11B illustrates schematically a cut-away view of receptacles 15A, 16A taken along the lines 11B in FIG. 10A.

FIG. 12A is a schematic illustration showing a close-up view of a preferred embodiment assembly of the present invention comprising a car bumper section or portion 14, support 10, receptacle portions 15A, 16A, and protruding connector portions 17A, 18A (which may be pointed) (shown in EXTENDED position in FIG. 12A) which are mounted in solenoids 19, which optionally may be operable only when the car is stationary or moving at a very slow speed. The connector portions 17A,18A may be magnetized to facilitate attachment to the metallic portions of receptacles 15A and 16A. The portion 14A may be movably mounted on springs 24 to provide for adjustment.

FIG. 12B is a close up schematic view of the receptacles 15A, 16A comprising a cover (such as for example, a rubber surround) having slits or openings into which the connectors 17A, 18A may be inserted. The configuration of 15A, 16A may be rectangular, as shown in FIG. 12B.

FIG. 14A is a schematic illustration of a bumper or support portion 14A the launching/extension of the contactor/connector portions 17A (or 18A) utilizing a piston rod 32 in connection with a lever operating on a pivot 31.

FIG. 14B is a schematic illustration of a bumper or support portion 14A the extension of the contactor/connector portions 17A (or 18A) utilizing a lever 32. The lever 32 may be biased so as to be actuated only by movement of the car; i.e. an unintended push by a human did not actuate the extension or contactor/connector protruding portion 17A, 18A.

FIG. 16A is a schematic illustration showing a close-up view of a preferred embodiment assembly of the present invention comprising a car bumper section or portion 14 or 14A, support, guides 29, receptacle portions 15A, 16A movably mounted on springs 24, and protruding connector portions 17A, 18A (which may be pointed) (shown in EXTENDED position in FIG. 15A) which are mounted in solenoids 19, which optionally may be operable only when the car is stationary or moving at a very slow speed. The connector portions 17A,18A may, be magnetized to facilitate attachment to the metallic portions of receptacles 15A and

16A. The portion 14A may also be movably mounted on springs 24 to provide for adjustment.

FIG. 16B is a close up schematic view of the spring mounted receptacles 15A, 16A comprising a cover (such as for example, a rubber ore plastic cover or surround) having slits or openings into which the connectors 17A, 18A may be inserted. The configuration of 15A, 16A may be rectangular, as shown in FIG. 16B.

FIG. 17 is a schematic illustration showing a top view of a preferred embodiment assembly of the present invention comprising a car bumper section or portion 14 or 14A, support, guides 29, receptacle portion (either 15A or 16A) movably mounted on springs 24, and protruding connector portion (17A or 18A) (which may be pointed) (shown in EXTENDED position in FIG. 15A) which are mounted in solenoids 19, which optionally may be operable only when the car is stationary or moving at a very slow speed. The connector portions 17A or 18A may be magnetized to facilitate attachment to the metallic portions of receptacles 15A and 16A. The portion 14A may also be movably mounted on springs 24 to provide for adjustment.

FIG. 18 is a schematic illustration showing a top view of a preferred embodiment assembly of the present invention comprising a car bumper section or portion 14 or 14A, support, guides 29A, receptacle portion (either 15A or 16A) movably mounted on springs 24, and protruding connector portion (17A or 18A) (which may be pointed) (shown in EXTENDED position in FIG. 15A) which are mounted in solenoids 19. The portion 14A may also be movably mounted on springs 24 to provide for adjustment. The guides 29A also operate as negative charge carrying connectors which contact a metallic surface of vehicle which is grounded to complete the negative portion of the charging circuit.

FIG. 19 is a close-up schematic view of a receptacle 15A or 16A, further showing tightly strung wires for holding the protruding connectors in position.

Figure 20A:
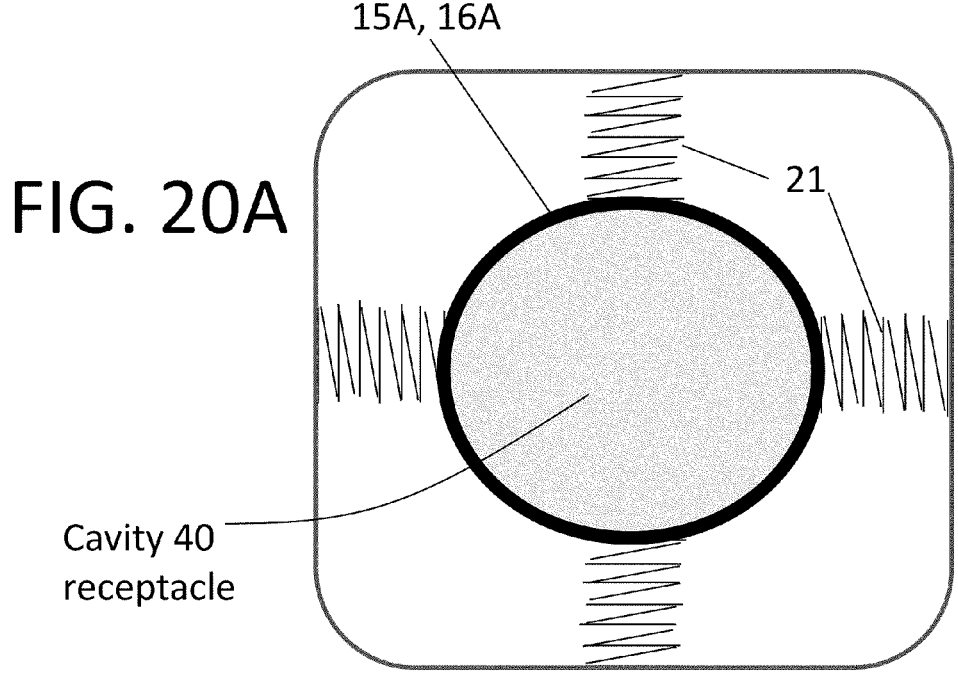

FIG. 20A is a close-up schematic view of a receptacle 15A or 16A, further showing a cavity receptacle for holding the protruding connectors 17A, 17B in position.

Figure 20B:
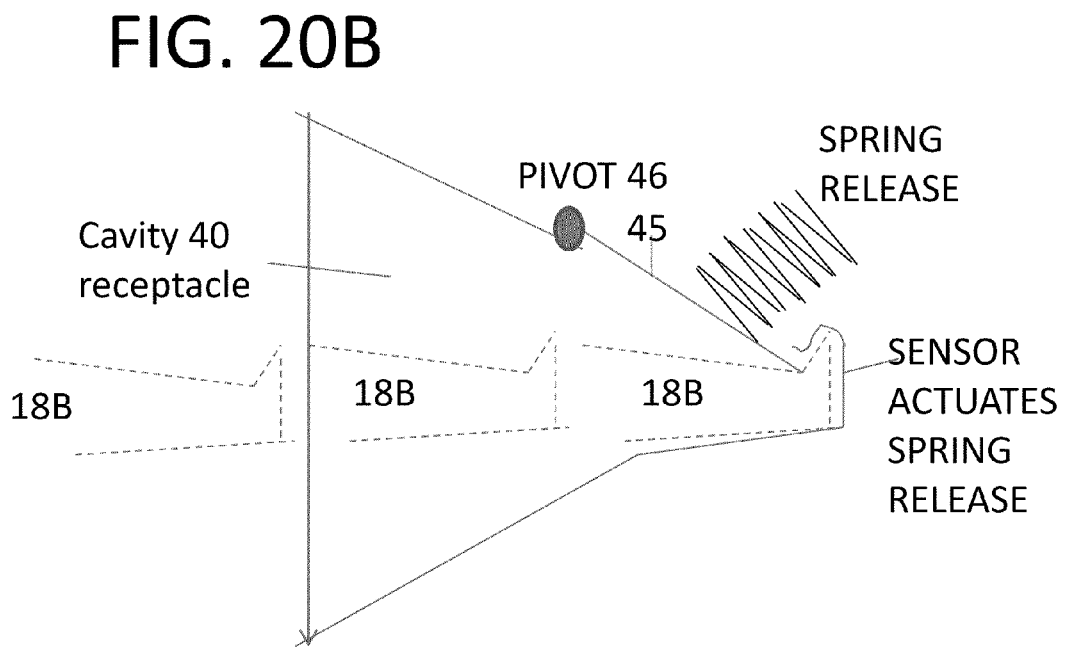

FIG. 20B is a close-up schematic view of a modified receptacle 15A or 16A, further showing a cavity receptacle for holding the protruding connectors 17A, 17B in position and further comprising a sensor which actuates a spring release such that the sidewall prevents the protruding connector from inadvertent release as it locks it into place.

Figure 21A:
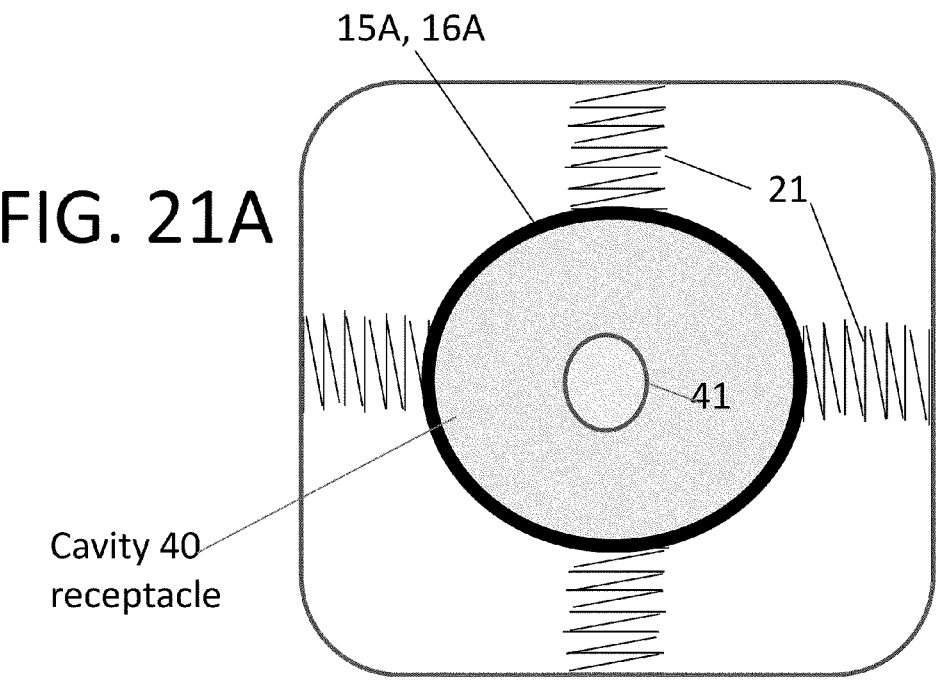
Figure 21B:
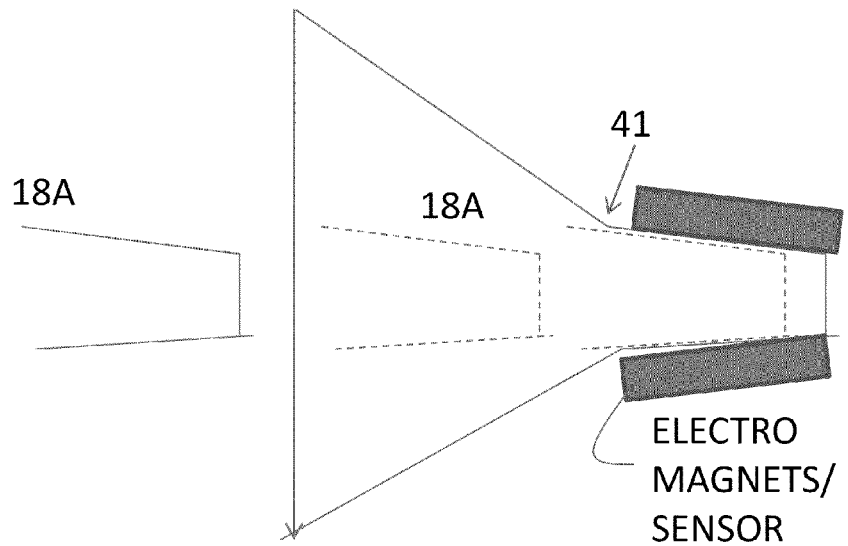

FIG. 21A is a close-up schematic view of a modified receptacle 15A or 16A, further showing a cavity receptacle for holding the protruding connectors 17A, 17B in position and further comprising a reduced section 41 and electromagnets/sensors which prevents the protruding connector from inadvertent release as it is held in place.

Figure 22:
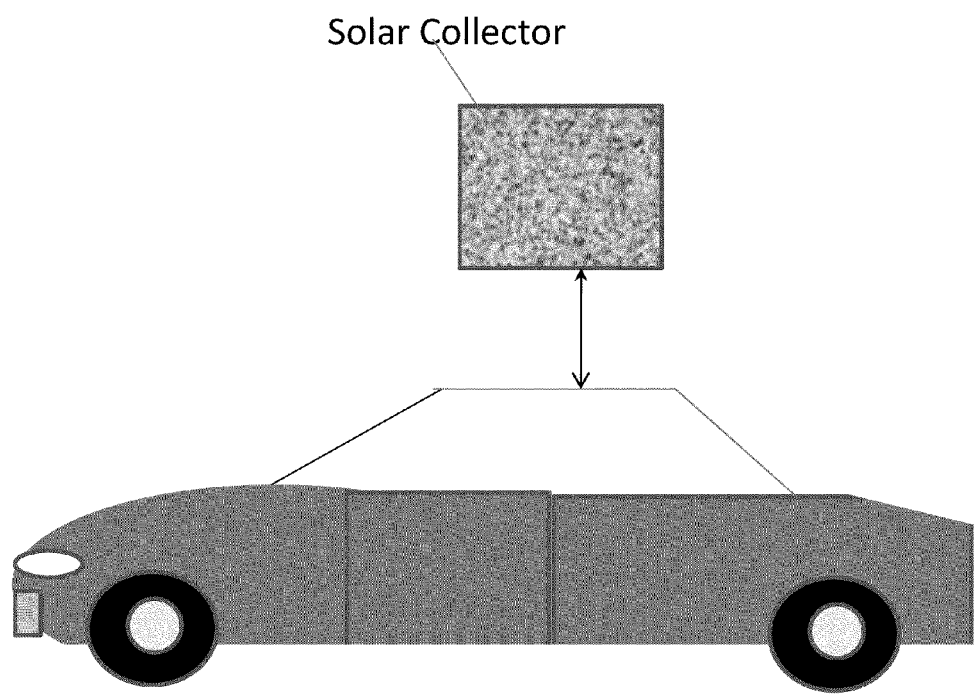

FIG. 22 is schematic illustration of a car having a solar collector on the roof.

Figure 23:
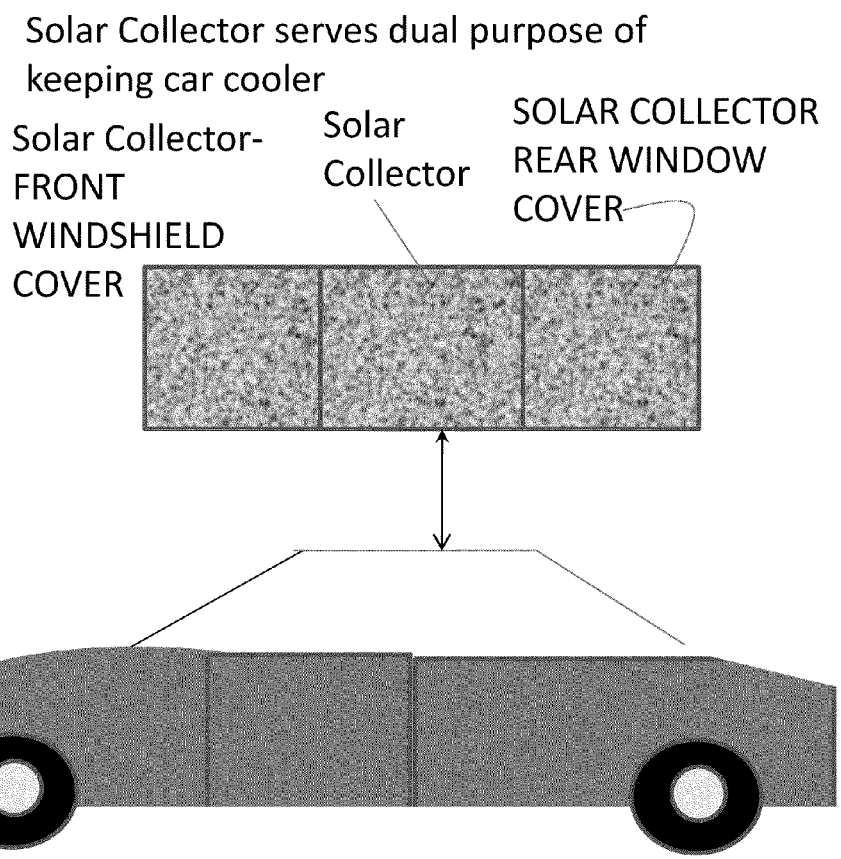

FIG. 23 is schematic illustration of a car having a solar collector on the roof and front and rear windows.

FIG. 24 is schematic illustration of a car having a solar collector on the roof and front and rear windows; further comprising hinges between sections for folding as illustrated.

Figure 25:
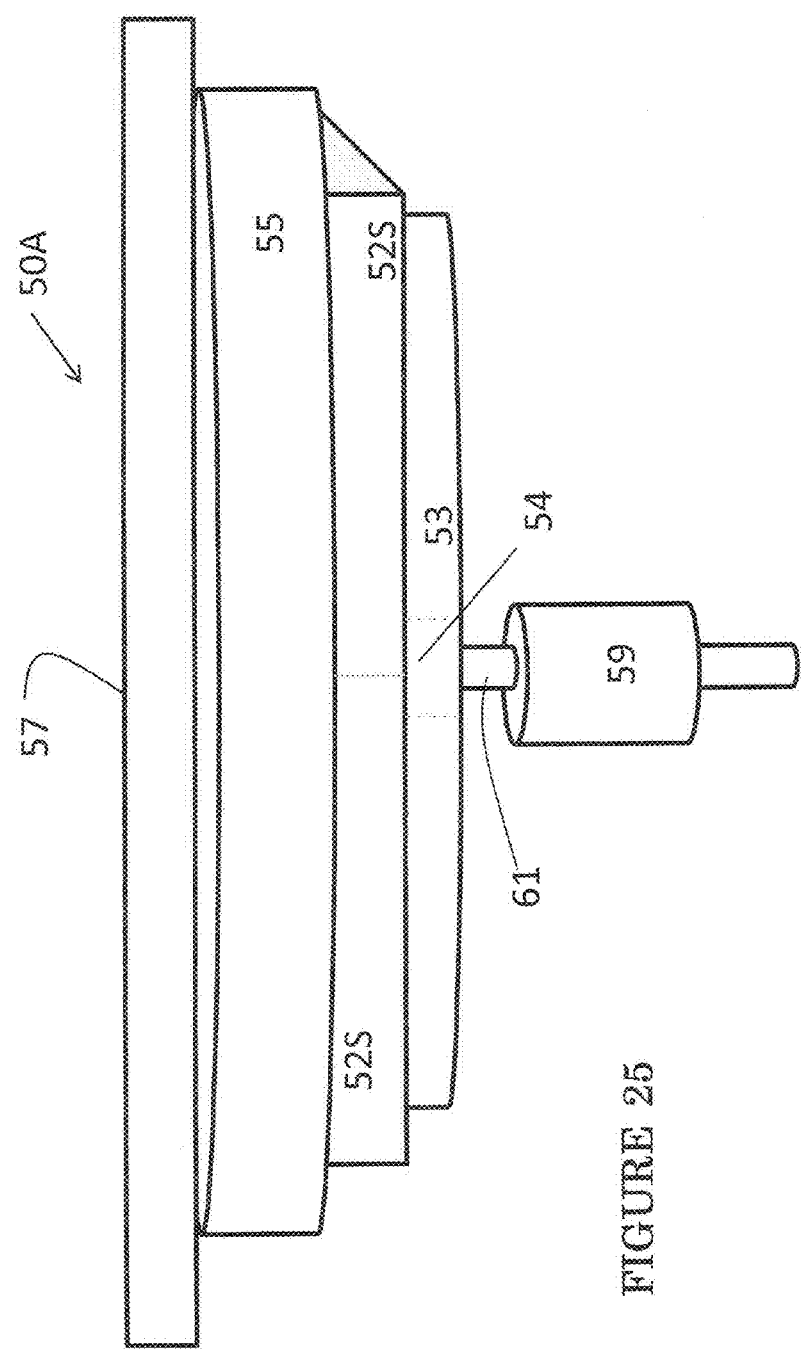

FIG. 25 is an illustration showing a side view of a preferred embodiment assembly 50A of the present invention comprising solar panels support 52, LED support 53, central portion 54, cover 55, wind direction detector 57, and motor/generator 59.

Figure 26:
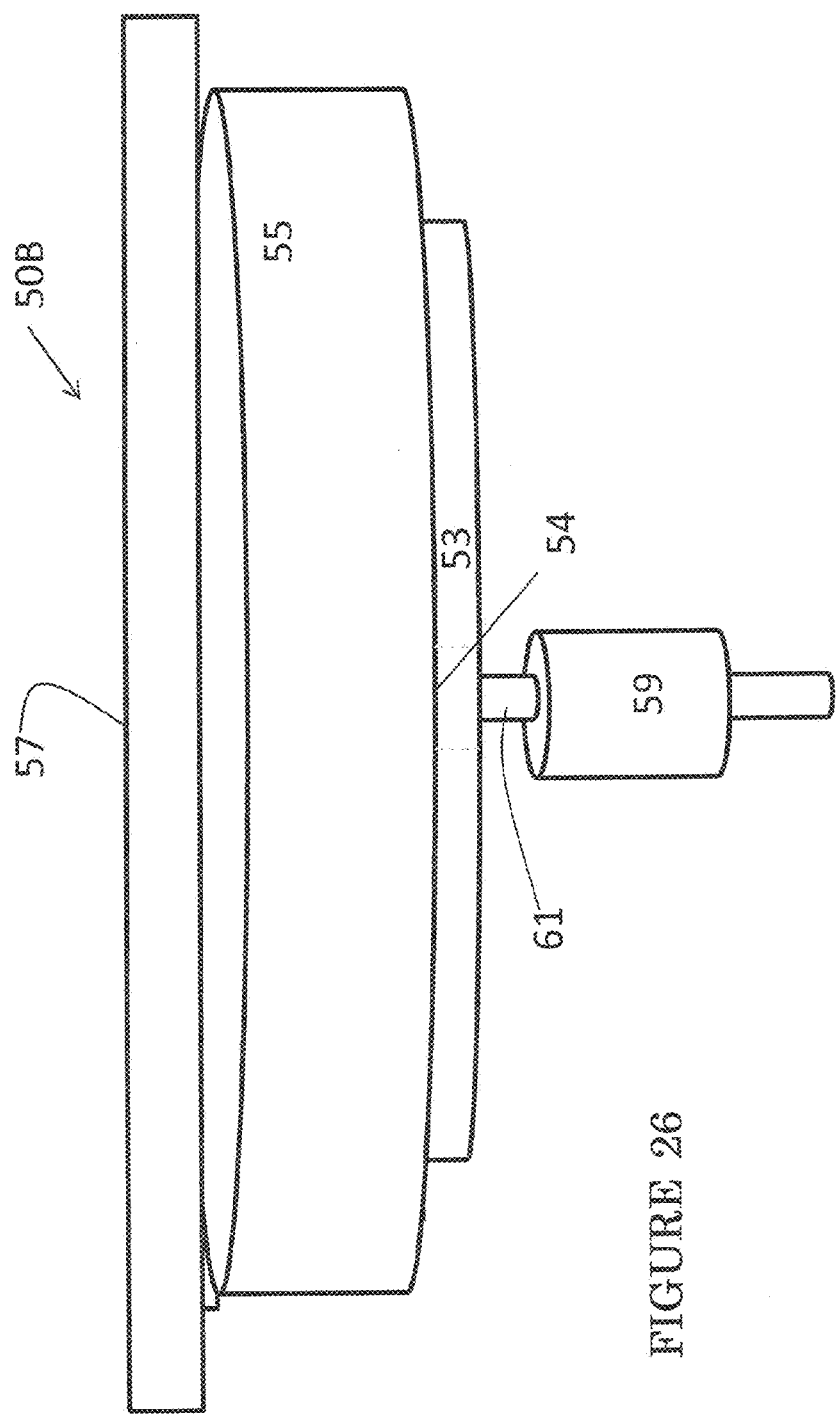

FIG. 26 is an illustration of another preferred embodiment assembly 50B wherein the vanes 56 are located between the solar support 52 and LED support 53 to increase cooling.

Figure 27:
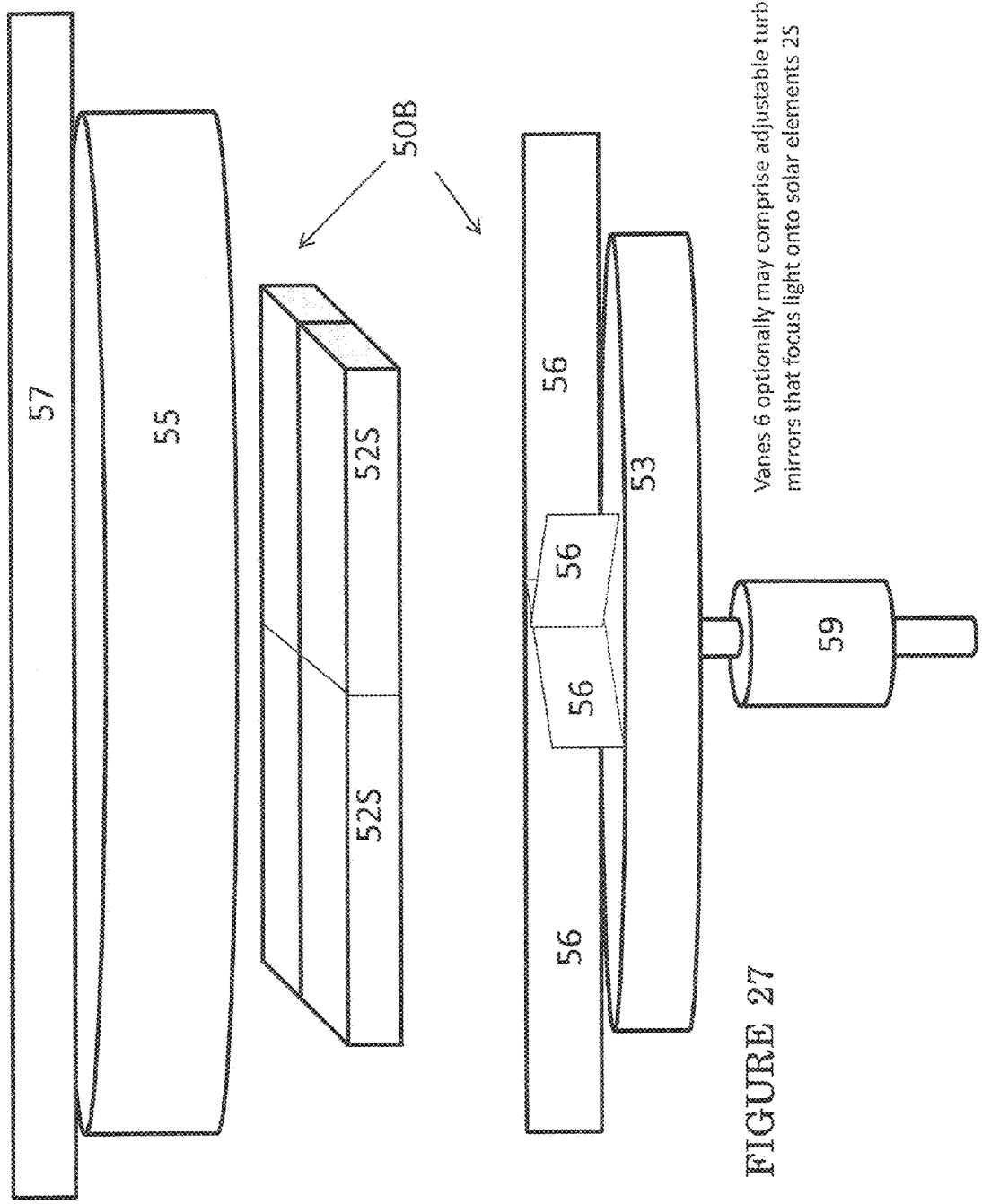

FIG. 27 is an illustration showing a cut-away view of the solar panels 52 and support 53, and vanes 56 of the preferred embodiment of the present invention shown in FIG. 26.

Figure 28:
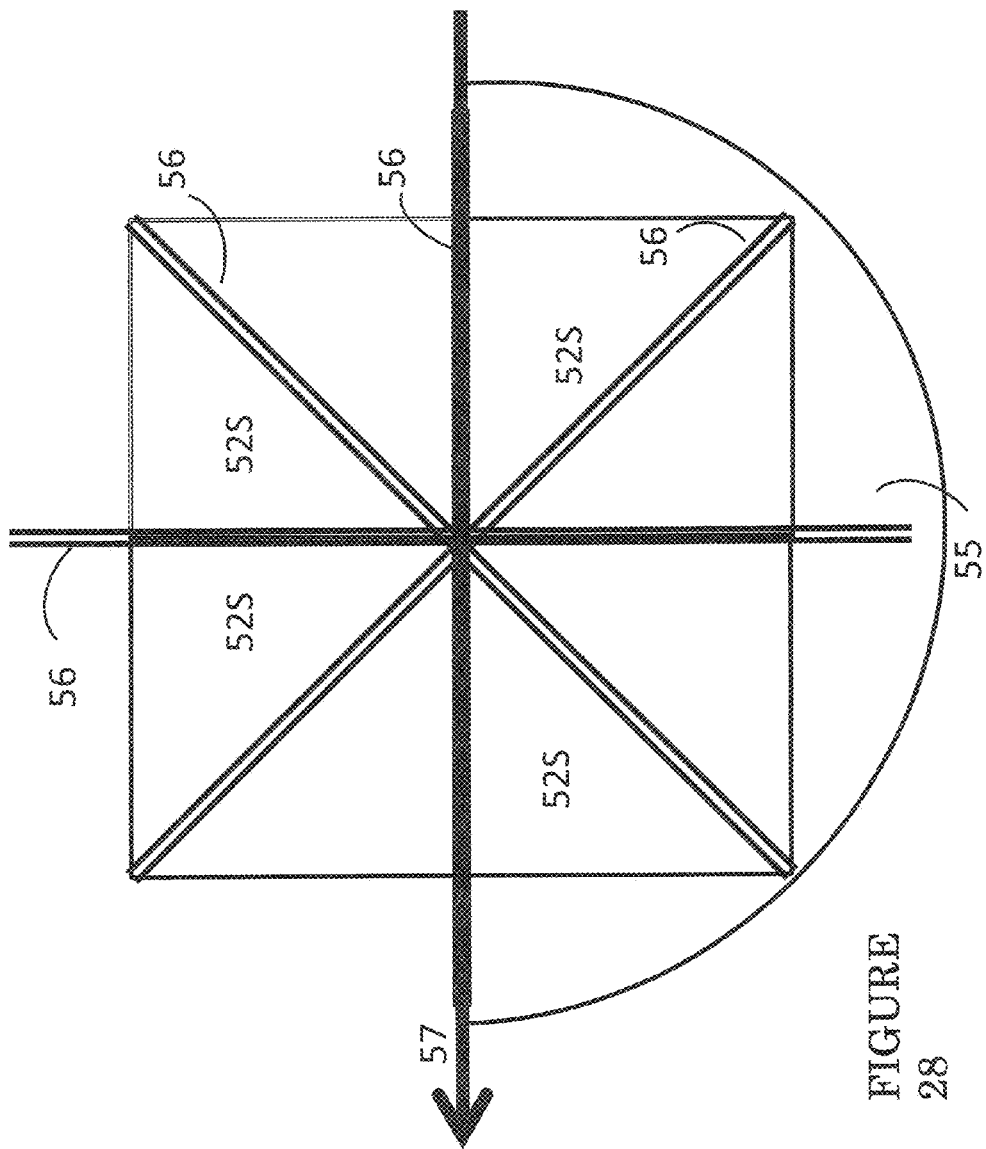

FIG. 28 is an illustration from an overhead perspective of the assembly of FIG. 25 showing the orientation of cover 55 responsive to a wind direction from the right to the left of the page.

Figure 29:
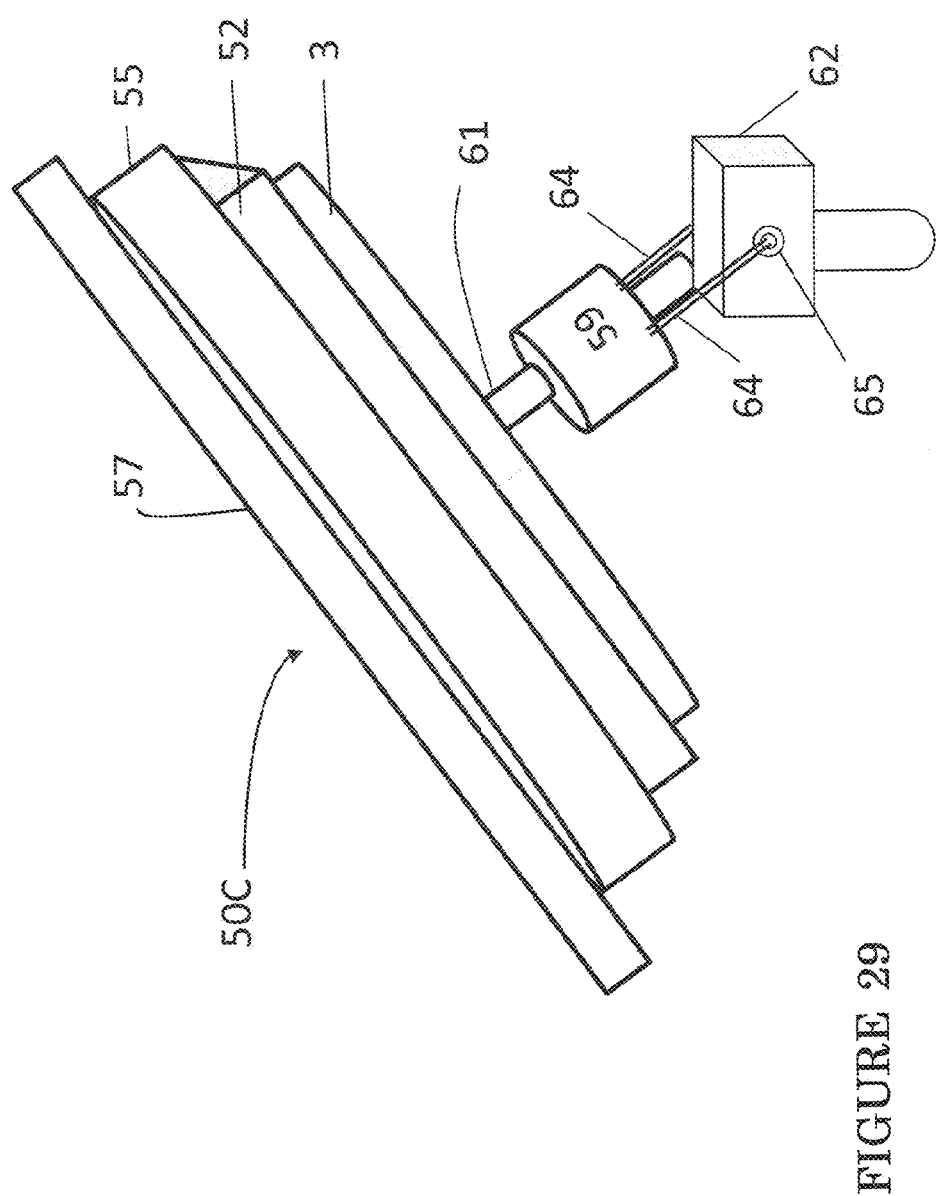

FIG. 29 is a side view illustration of the preferred embodiment of FIG. 25 which has the optional capability of tilting at an angle to gain maximum exposure to the sun.

Figure 30:
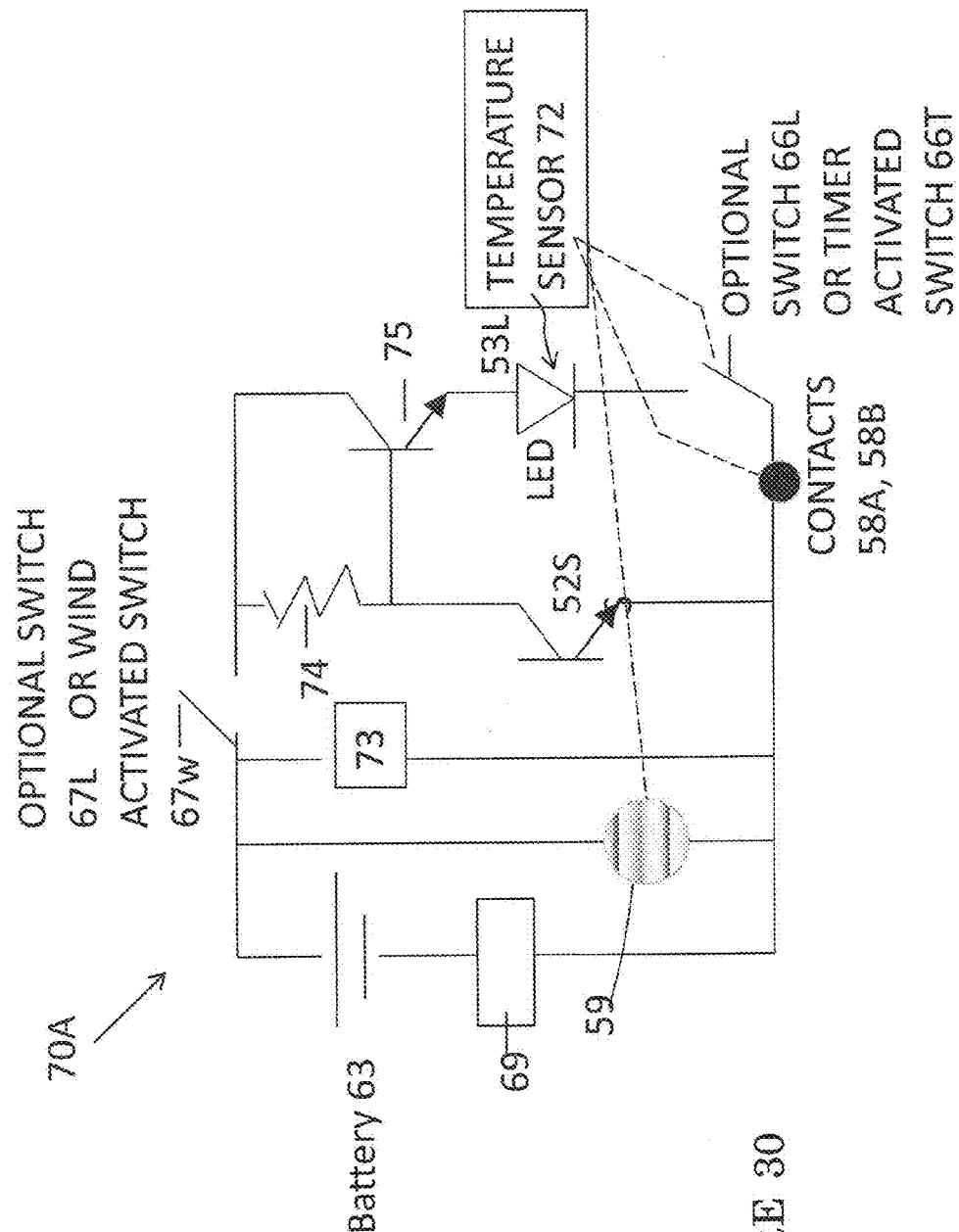

FIG. 30 is a schematic circuit 70A diagram of a preferred embodiment of the present invention.

Figure 31:
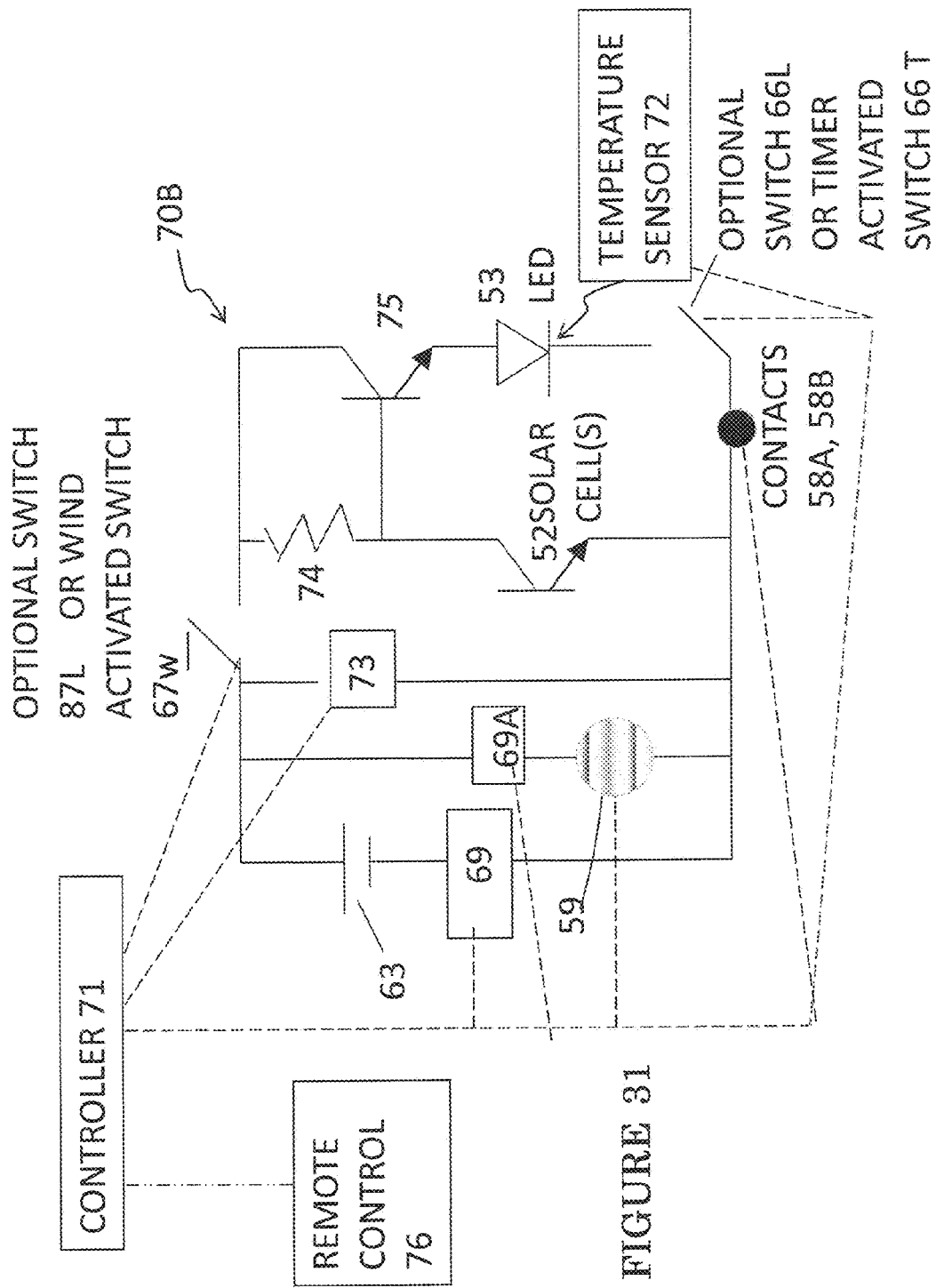

FIG. 31 is a schematic circuit 70B diagram showing the optional controller with control lines represented by dashed lines.

DETAILED DESCRIPTION OF PREFERRED EMBODIMENTS

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout the description of the figures.

It will be understood that when an element is referred to as being "on" another element, it can be directly on the other element or intervening elements may be present. In contrast, when an element is referred to as being "directly on" another element, there are no intervening elements present. It will be understood that when an element is referred to as being "connected" or "coupled" to another element, it can be directly connected or coupled to the other element or intervening elements may be present. In contrast, when an element is referred to as being "directly connected or coupled" to another element, there are no intervening elements present. Furthermore, "connected" or "coupled" as used herein may include wirelessly connected or coupled. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first layer could be termed a second layer, and, similarly, a second layer could be termed a first layer without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," "left" or right" may be used herein to describe one element's relationship to other elements as illustrated in the Figures. It will be understood that relative terms are intended to encompass different orientations of the device in addition to the orientation depicted in the Figures. For example, if the device in one of the figures were turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Figure 1:
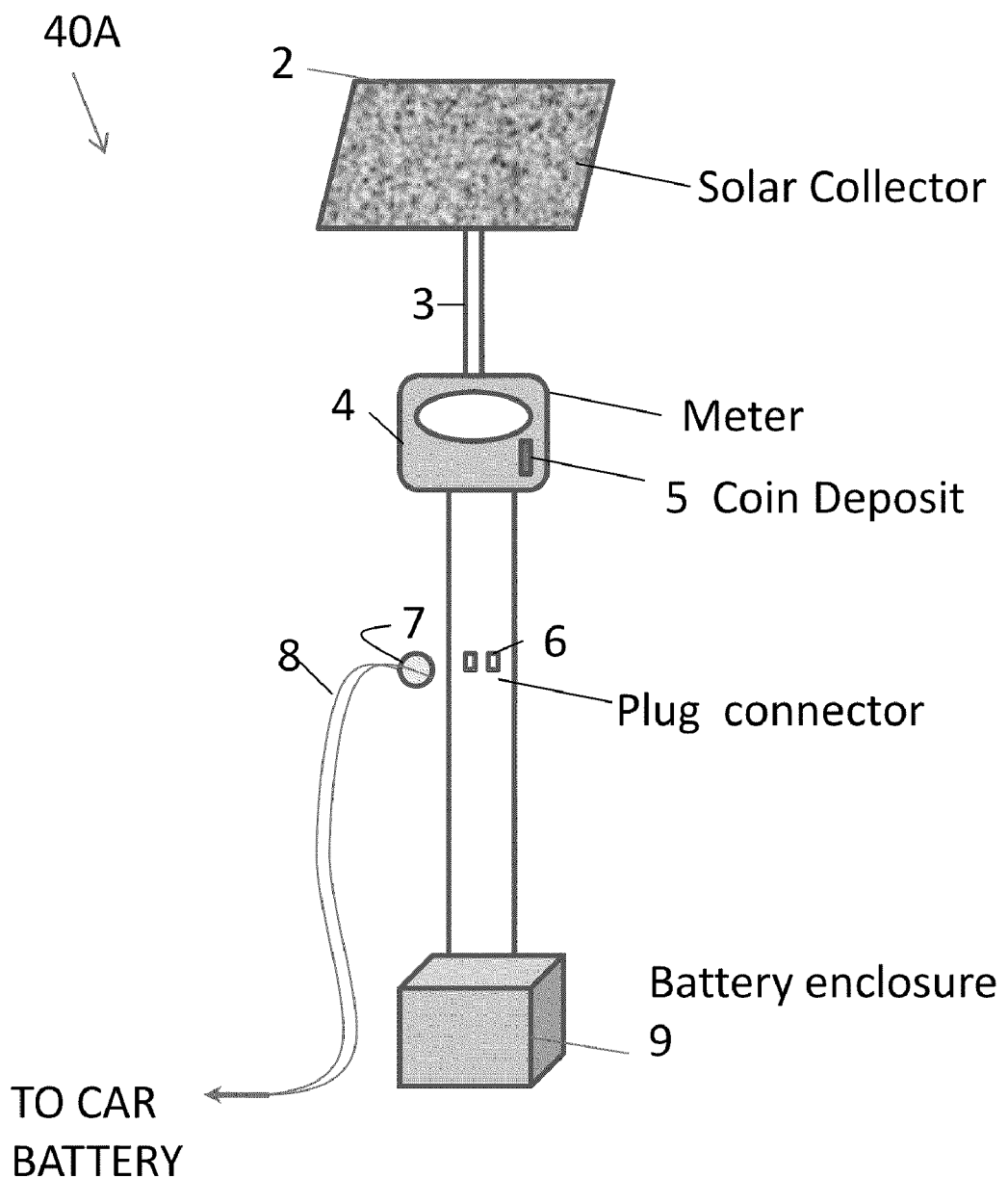
FIG. 1 is a schematic illustration showing a view of a preferred embodiment assembly of the present invention comprising solar collector 2, solar panel support 3, central portion 4, coin deposit 5, plug (receptacle) connector 6.

FIG. 1 is a schematic illustration showing a view of a preferred embodiment assembly of the present invention comprising solar collector 2, solar panel support 3, central portion 4, coin deposit 5, plug (receptacle) connector 6. The solar collector 2 collects photons which are in turn converted to electricity to for supply to either a battery 9, which may be positioned behind the collector or in a base near the ground. Alternatively, the assembly may be wired to a public distribution grid for supply of electricity 24 hours a day. The meter in the housing or central portion 4 may include a means for dispensing electricity. For example, a person paying into the meter may receive electricity in return, the amount of which depending upon the amount paid. This may be down in conjunction with the standard parking meter or as a primary selection; i.e., a meter primarily for the dispensing of electricity. This provides a revenue stream for the property owner, such as a town or city, and provides a means for electric car owners to recharge their cars which shopping, attending to business or dining or working. The plug connector may be the same or similar to the plug connectors used to recharge the Chevy Volt. The cable 8 connects the electric vehicle to the receptacle or plug connector 6 by means of a plug 7.

Figure 2:
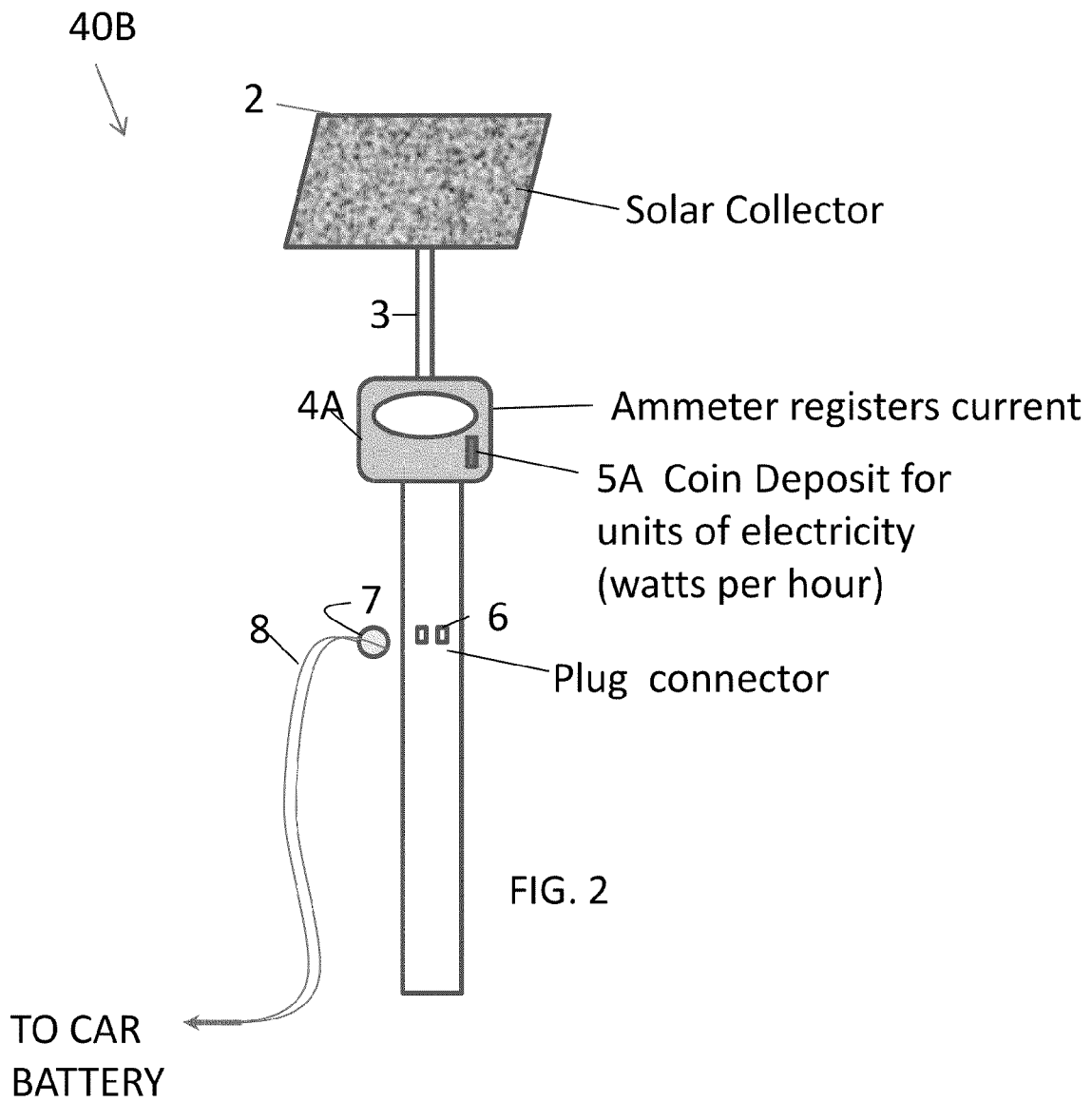
FIG. 2 is a schematic illustration showing a view of a preferred embodiment assembly of the present invention comprising solar collector 2, panel support 3, central portion 4 comprising a meter for measurement of electricity transferred (dispensed), coin deposit 5, plug (receptacle) connector 6.

FIG. 2 is a schematic illustration showing a view of a preferred embodiment assembly of the present invention comprising solar collector 2, panel support 3, central portion 4 comprising a meter for measurement of electricity transferred (dispensed), coin deposit 5, plug (receptacle) connector 6. For example, the unit meter may charge a predetermined amount for a given amount of electricity. Moreover, the meter may be used to control the rate of the charge. The solar collector 2 may be used to collect photons for transfer to electricity. Alternatively, the assembly may be wired to a public distribution grid for supply of electricity 24 hours a day.

Figure 3:
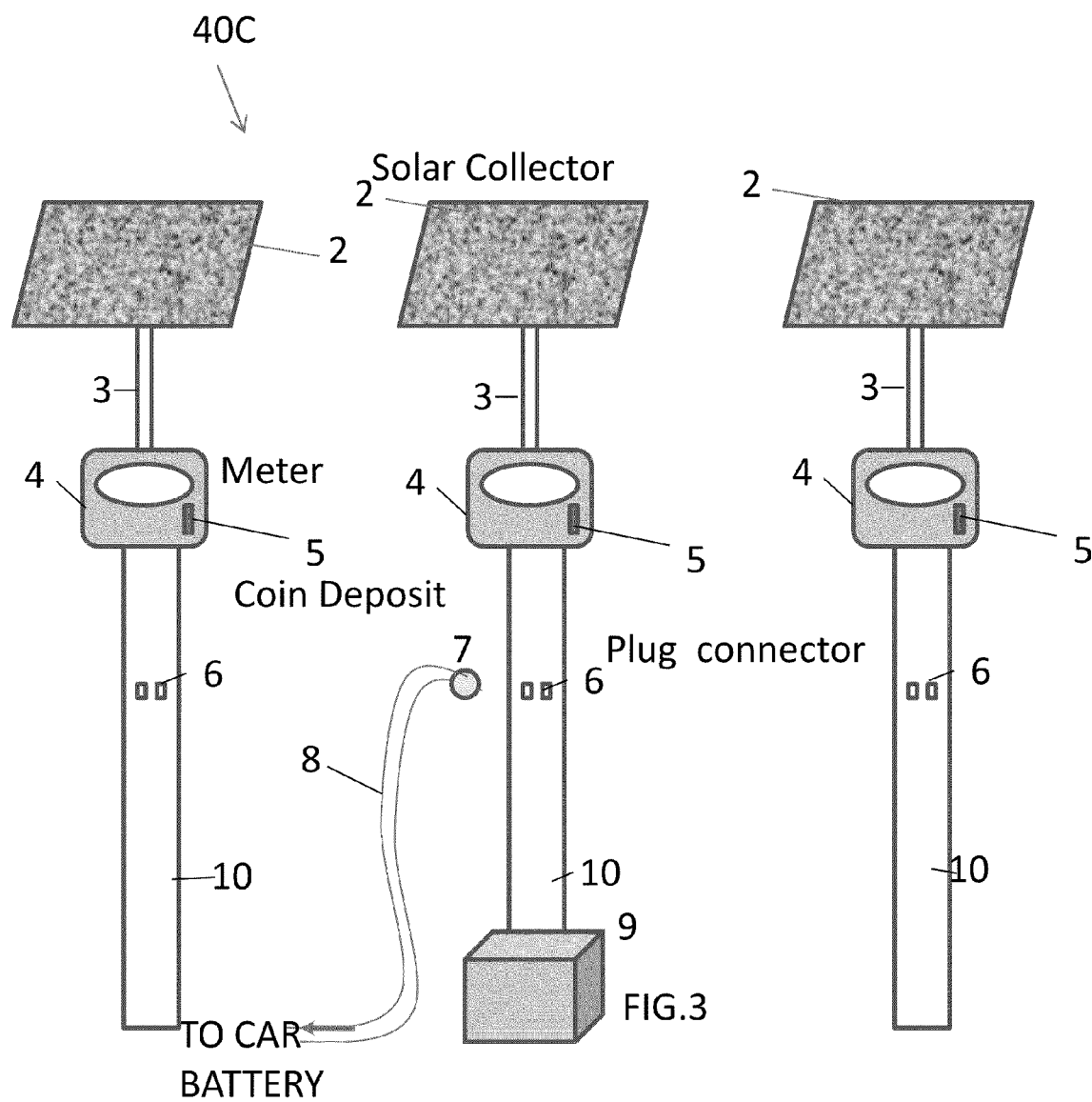
FIG. 3 is a schematic illustration showing a view of a preferred embodiment assembly of the present invention comprising a plurality of solar collectors 2, panel supports 3, central portions 4 (optionally comprising a meter for measurement of electricity transferred (dispensed)), coin deposit 5, plug (receptacle) connector 6, and support 10.

FIG. 3 is a schematic illustration showing a view of a preferred embodiment assembly of the present invention comprising a plurality of solar collectors 2, panel supports 3, central portions 4 (optionally comprising a meter for measurement of electricity transferred (dispensed)), coin deposit 5, plug (receptacle) connector 6, and support 10. The electricity collected via the solar collector 2 may be stored in a central battery 9 or individual batteries may be positioned adjacent each support 10 or behind the collector 2. Alternatively, the assembly may be wired to a public distribution grid for supply of electricity 24 hours a day. The meter assemblies may be positioned adjacent to car parking places or garages for dispensing of electricity to allow recharging of batteries of an electric vehicle.

FIG. 4 is a schematic illustration showing a view of a preferred embodiment assembly of the present invention comprising a solar collector 2, panel support 3, central portions 4 (optionally comprising a meter for measurement of electricity transferred (dispensed)), plug (receptacle) connectors 6, and supports 10. Alternatively, the assemblies may be wired to a public distribution grid for supply of electricity 24 hours a day. The wires 11W represent underground connection of the assemblies. The wires 11W may also be connected to the public electrical grid for both obtaining electricity from the grid and for supplying electricity to the grid, as well as to the electrical vehicles parking nearby.

FIG. 5A is a schematic illustration showing a view of a preferred embodiment assembly of the present invention comprising a car 12 and a car front or back bumper section or portion 14, support 10 for a meter (details of which are not shown). The meter support 10 may also include a battery (not shown). As depicted in FIGS. 5A and 5B, the bumper of a car may be positioned adjacent or in the proximity of the support 10 so that charging contacts positioned in the car bumper or chassis portion engage corresponding contacts (or receptacles) 15 and 16. It can be appreciated by those of ordinary skill in the art that a ground can be used for one of the contacts; similar in nature to the grounding of vehicle frames and bumpers in cars of the 1950s, 1960s and 1970s. Using a grounded vehicle bumper or metallic vehicle surface, the vehicle surface may be positioned adjacent to a metallic surface of the support 10. The other contact must then be insulated from the metallic surface which engages the ground of the vehicle.

By making the contacts on the exterior of the vehicle, there is no need for a cumbersome cord between the vehicle and the meter assembly. This averts exposure of such a cord to mischief or stealth. Moreover, the cord can itself be a hazard in that it may be tripped over. In bad weather, a person could be electrocuted while handling the cord improperly.

FIG. 5B is a schematic illustration showing a close-up view of a preferred embodiment assembly of the present invention comprising a car bumper section or portion 14, support 10, receptacle portions 15, 16, ad protruding connector portions 17, 18, FIG. 6A is a schematic illustration showing a close-up view of another preferred embodiment assembly of the present invention comprising a car bumper section or portion 14, support 10, receptacle portions 15A, 16A, and protruding connector portions 17, 18. The protruding contacts 17 and 18 may be movable so as to recede into the car bumper when not in use. This prevents exposure of a charged contact to individuals or animals. The receptacle portions 15A and 16A may be covered with insulating material such as rubber or synthetic rubber. The receptacle portions 15A, 16A may include a slit or cut opening to allow entry of the protruding portions or contacts 17, 18 into the receptacles 15A, 16A to complete the electrical charging circuit. Alternatively, only one terminal (the positive terminal) need be covered and insulated with the negative charge being carried by a ground wire or ground circuit connection, such as a metallic surface of the vehicle engaging a metallic portion of the support 10. Although the support 10 appears as a post or pole, the receptacles may be mounted to a wall or any type of support.

FIG. 6B is a close up schematic view of the receptacles 15A, 16A comprising a cover (such as for example, a rubber surround) having slits or openings into which the connectors 17, 18 may be inserted. The opening may be such as to allow entry of protruding connectors 17, 18 while providing an enclosure to prevent water or other elements from entering the receptacle.

FIG. 7A is a schematic illustration showing a close-up schematic view of a preferred embodiment assembly of the present invention comprising a car bumper section or portion 14, support 10, receptacle portions 15A, 16A, ad protruding connector portions 17, 18 which are mounted in solenoids 19 (shown in retracted position in FIG. 7A), The connector portions 17,18 may be magnetized to facilitate attachment to the metallic portions of receptacles 15A and 16A. As shown in FIG. 7A, the protruding contacts 17, 18 recede into the housing, which may be a component in a car bumper 14. The retractable protruding portions 17, 18 may be retracted by solenoids 19. In this manner, the electrical contacts 17, 18 are not exposed external to the car bumper 14 so as to not endanger persons in the vicinity.

FIG. 7B is a close up schematic view of the receptacles 15A, 16A comprising a cover (such as for example, a rubber surround) having slits or openings into which the connectors 17, 18 may be inserted. The receptacles 15A, 16A may be of any configuration such as a square, diamond, oval, circle, or the like.

Figure 8B:
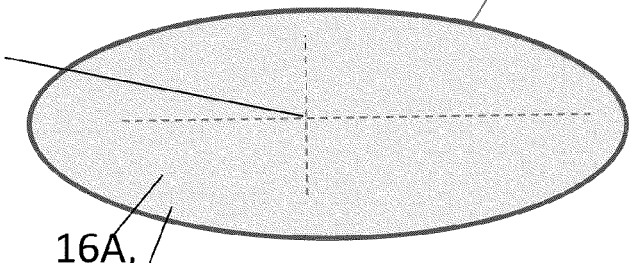
FIG. 8B is a close up schematic view of the receptacles 15A, 16A comprising a cover (such as for example, a rubber or plastic cover or surround) having slits or openings into which the connectors 17A, 18A may be inserted (one of which is illustrated).
Figure 8A:
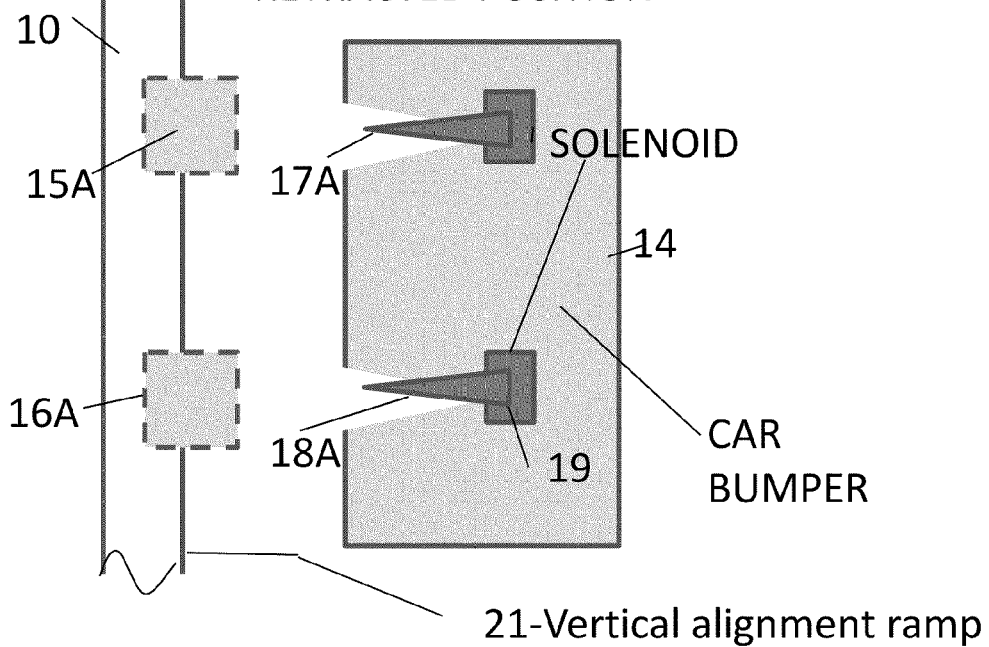
FIG. 8A is a schematic illustration showing a close-up view of a preferred embodiment assembly of the present invention comprising a car bumper section or portion 14, support 10, receptacle portions 15A, 16A, ad protruding connector portions 17A, 18A (which may be pointed) which are mounted in solenoids 19 (shown in retracted position in FIG. 8A), The connector portions 17A, 18A may be magnetized to facilitate attachment to the metallic portions of receptacles 15A and 16A.

FIG. 8A is a schematic illustration showing a close-up view of a preferred embodiment assembly of the present invention comprising a car bumper section or portion 14, support 10, receptacle portions 15A, 16A, and retractable protruding connector portions 17A, 18A (which may be pointed) which are mounted in solenoids 19 (shown in retracted position in FIG. 8A), The connector portions 17A,18A may be magnetized to facilitate attachment to the metallic portions of receptacles 15A and 16A. As shown, the protruding connector portions may be pointed to facilitate entry into the receptacles 15A and 16A. Shown in FIG. 8A are the charging contacts in the receded position inside a car bumper or a component housing on the front or back of a vehicle. Shown in FIG. 8A is a ramp 21 to facilitate the vertical positioning of the housing 14 relative to the receptacles 15A, 16A.

FIG. 8B is a close up schematic view of the receptacles 15A, 16A comprising a cover (such as for example, a rubber or plastic cover or surround) having slits or openings into which the connectors 17A, 18A may be inserted. Although an oval configuration is shown, a variety of configurations may be used without departing from the scope of the invention.

FIG. 9A is a schematic illustration showing a close-up view of a preferred embodiment assembly of the present invention comprising a car bumper section or portion 14, support 10, receptacle portions 15A, 16A, and protruding connector portions 17A, 18A (which may be pointed) (shown in EXTENDED position in FIG. 9A) which are mounted in solenoids 19, which optionally may be operable only when the car is stationary or moving at a very slow speed. The connector portions 17A, 18A may be magnetized to facilitate attachment to the metallic portions of receptacles 15A and 16A. Also shown in FIG. 9A is a vertical alignment of the receptacles 15A, 216A with the housing 14.

FIG. 9B is a close up schematic view of the receptacles 15A, 16A comprising a cover (such as for example, a rubber surround) having slits or openings into which the connectors 17A, 18A may be inserted. Also shown is the tip of the protruding portions 18A, 17A.

Figures 10A, 10B:
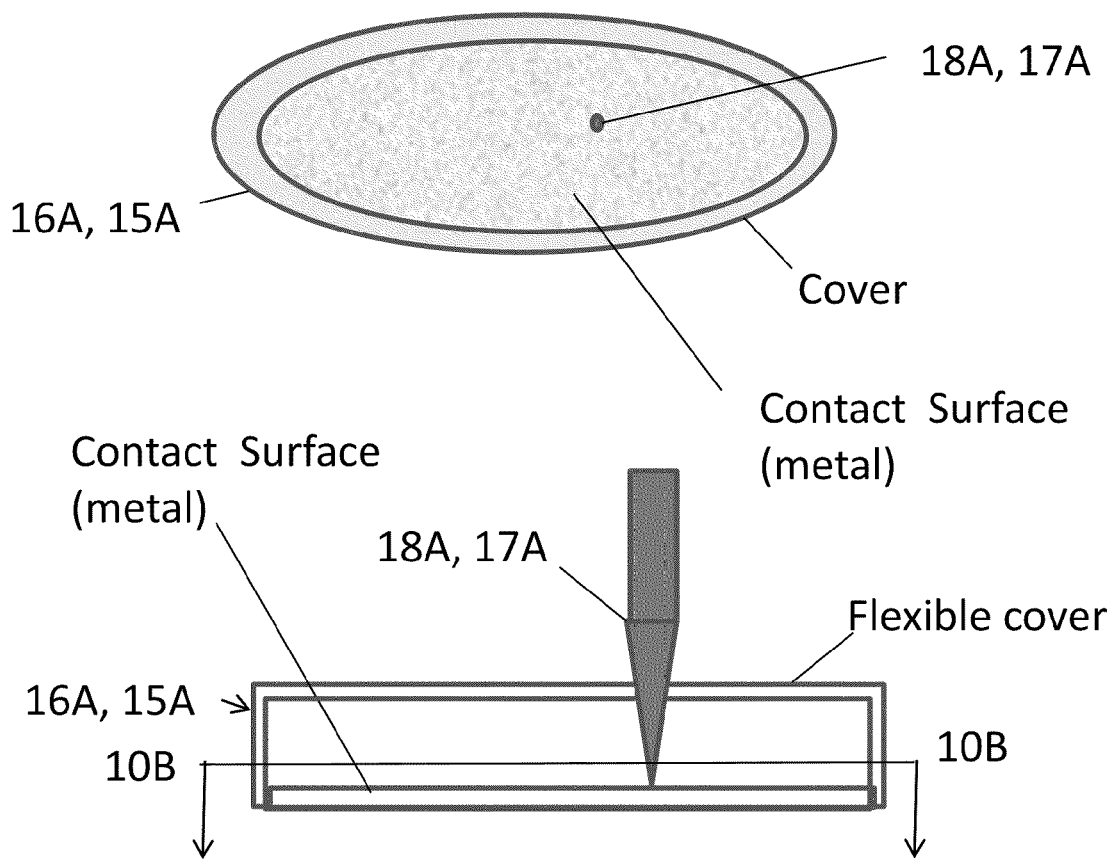
FIG. 10A is a close up schematic view of the receptacles 15A, 16A comprising a cover (such as for example, a rubber surround) having slits or openings into which the connectors 17A, 18A may be inserted.
FIG. 10B illustrates schematically a cut-away view of receptacles 15A, 16A taken along the lines 10B in FIG. 10A.

FIG. 10A is a close up schematic view of an example of one of receptacles 15A, 16A comprising a cover (such as for example, a rubber surround) having slits or openings into which the connectors 17A, 18A may be inserted.

FIG. 10B illustrates schematically a cut-away view of receptacles 15A, 16A taken along the lines 10B in FIG. 10A. An example of a protruding connector tip is should associated with the 18A, 17A in FIG. 10B.

FIG. 11A is a close up schematic view of the receptacles 15B, 16B comprising a cover (such as for example, a rubber surround) having slits or openings into which the connectors 17A, 18A may be inserted.

FIG. 11B illustrates schematically a cut-away view of receptacles 15A, 16A taken along the lines 11B in FIG. 10A. In FIG. 11B, the tips of the protruding contact portions may wedge between louvered receptacle surfaces so that the protruding portions are held in place during the charging of the vehicle battery. Alternately the back surface of the receptacle 17A, 18A may be a flexible grid surface which surrounds and engages the tips of the protruding portions 17A, 18A for a secure connection while charging takes place.

FIG. 12A is a schematic illustration showing a close-up view of a preferred embodiment assembly of the present invention comprising a car bumper section or portion 14, support 10, receptacle portions 15A, 16A, and protruding connector portions 17A, 18A (which may be pointed) (shown in EXTENDED position in FIG. 12A) which are mounted in solenoids 19, which optionally may be operable only when the car is stationary or moving at a very slow speed. The connector portions 17A,18A may be magnetized to facilitate attachment to the metallic portions of receptacles 15A and 16A. The portion 14A may he movably mounted on springs 24 to provide for adjustment. As the vehicle moves towards the charging assembly 40A-40D, a vertical alignment ramp positioned adjacent to the support 10 may be engaged by a wheel on the bottom of the housing 14A which drives the housing 14A vertically such that the protruding contacting portions 17A, 18A are in vertical alignment to facilitate engagement of the protruding contact portions 17A, 17B with the receptacle portions 15A, 16A. The supports 25 are operatively connected to the vehicle frame, bumper or vehicle front, and the springs 234 allow movement of the housing 14A, which houses and supports the protruding contacts 17A and/or 18A to allow for alignment with the receptacles 15A, 16A. As the vehicle upon which the housing 14A is mounted approaches one of the assemblies 40A through 40D, the wheel 22 engages the ramp 21 and causes alignment of the housing 14A with the receptacles 15A, 16A to facilitate entry of the connector 17A, 18A into the receptacles 15A, 16A. It can be appreciated by those skilled in the art that although the receptacles 15A, 16A (as well as 15, 16) are positioned one above the other, they may be positioned side-by-side, diagonally or any predetermined position without departing from the scope of the invention. The receptacles may be positioned on a post, wall or any suitable supporting surface. This holds true for all of the assemblies 40A-40D. Although certain parts are associated with certain ones of the assemblies 40A through 40D, the components are fully interchangeable and the description is intended to convey this interchangeability. For example, the components shown in FIGS. 5A, 5B, 6A, 6B, 7A, 7B, 8A, 8B, 9A, 9B, 10B, 10A, 11A, 11B, 12A, 12B, 14A, 14B, 15A, 15B, 16A, 16B 17, 18, 19, 20A, 20B, 21A, 21B may be interchangeably used to replace the plug 7, cord 8, and plug connector 6 of the assemblies 40A-40D. Also, instead of solar panels, the source of power could come from a wind turbine or combination wind turbine solar cell as describe in detail in U.S. Pat. No. 7,789,524, hereby incorporated by reference as though fully rewritten herein.

FIG. 12B is a close up schematic view of the receptacles 15A, 16A comprising a cover (such as for example, a rubber surround) having slits or openings into which the connectors 17A, 18A may be inserted. The configuration of 15A, 16A may be rectangular, as shown in FIG. 12B.

Figure 13:
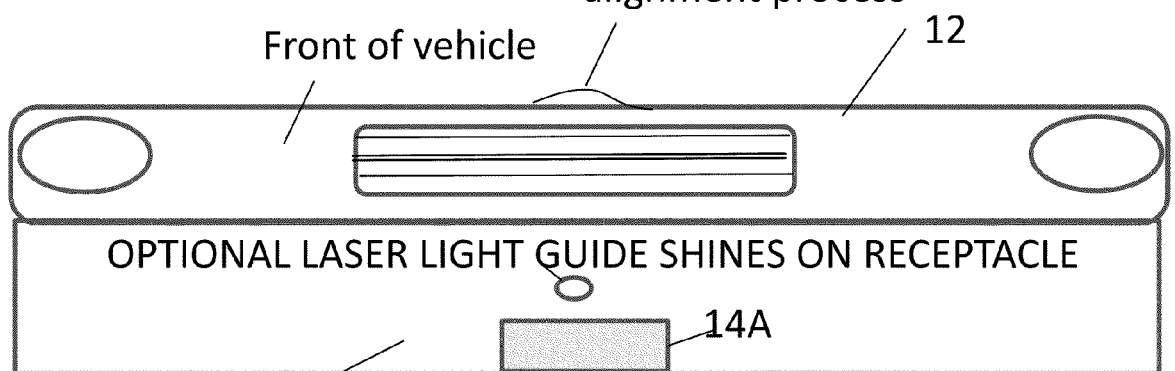
FIG. 13 is a schematic illustration of a front of a vehicle comprising optional guides.

FIG. 13 is a schematic illustration of a front of a vehicle comprising optional guides. A laser beam 41 may be emitted from the center of the vehicle to facilitate alignment of the protruding contacts with the receptacles as the driver approaches one of the assemblies 40A through 40D. Alternately, a signal may be emitted when the laser light beam is in proper alignment. Although the location of the beam is shown in the center of the car, any position is suitable without departing from the scope of the present invention as long as the relationship between the laser light beam and receptacle location results in the protruding contacts entering the receptacles at the proper location. An optional guide may be positioned on top of the hood as shown in FIG. 13. The assembly or housing 14A may be removably positioned on the exterior of the car so as to engage the corresponding receptacles on the support 10. For example, if a person has the charging assembly positioned in a location within his or her garage, the housing on the vehicle may be moved to suit the location of the charging assembly in the garage. It is likewise within the scope of the present invention to make the laser movable to reflect changes in relative location of the housing 14A.

FIG. 14A is a schematic illustration of a bumper or support portion 14A the launching/extension of the contactor/connector portions 17A (or 18A) utilizing a piston rod 32 in connection with a lever operating on a pivot 31. As the vehicle approaches the support 10 of assemblies 40A-40D, the piston rod is engaged by the support to drive the piston to the right as shown in FIG. 14A resulting in the protruding portion 17A being pushed to the left in FIG. 14A to enable the protruding contact 17A to enter one of the receptacles 15A, 15, 16, 16A in a manner well known to those in the art.

FIG. 14B is a schematic illustration of a bumper or support portion 14A the extension of the contactor/connector portions 17A (or 18A) utilizing a lever 32. The lever 32 may he biased so as to be actuated only by movement of the car; i.e. an unintended push by a human did not actuate the extension or contactor/connector protruding portion 17A, 18A. The present invention is not limited to the specific lever configuration and a variety of levers may be used without departing from the scope of the present invention.

Figure 15B:
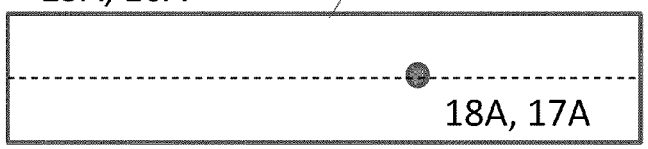
FIG. 15B is a close up schematic view of the spring mounted receptacles 15A, 16A comprising a cover (such as for example, a rubber surround) having slits or openings into which the connectors 17A, 18A may be inserted. The configuration of 15A, 16A may be rectangular, as shown in FIG. 15B.
Figure 15A:
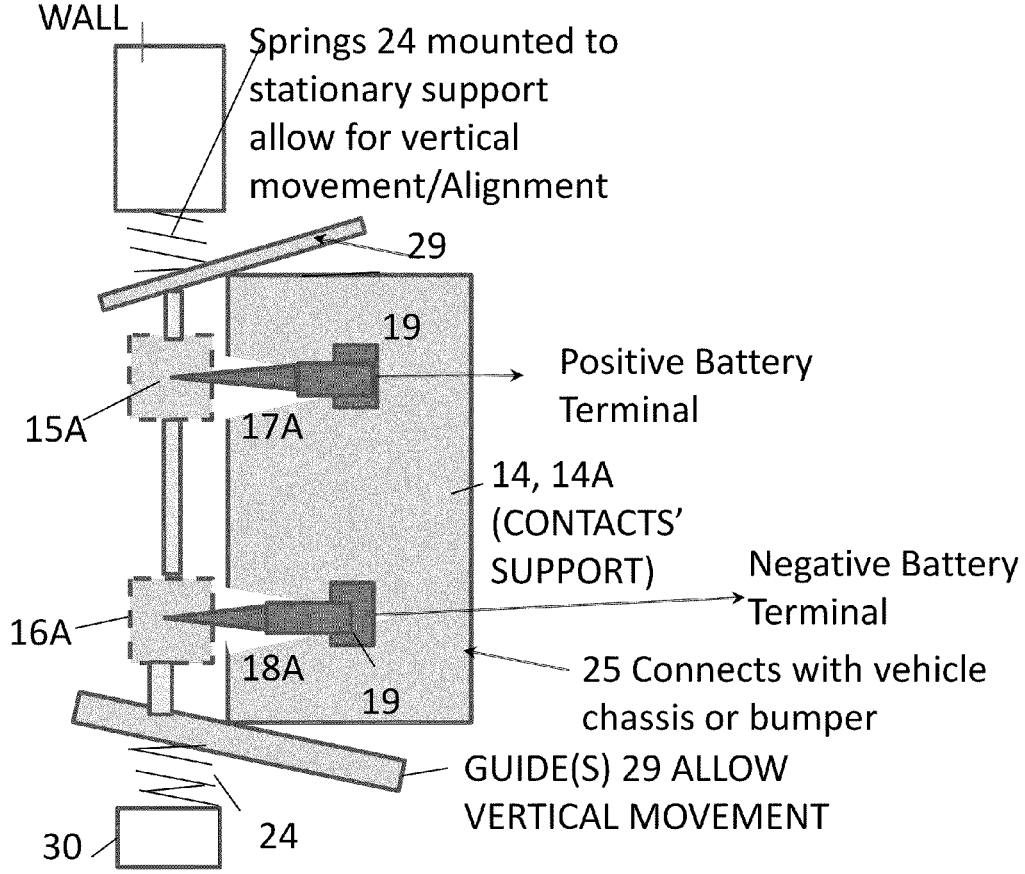
FIG. 15A is a schematic illustration showing a close-up view of a preferred embodiment assembly of the present invention comprising a car bumper section or portion 14 or 14A, support, receptacle portions 15A, 16A movably mounted on springs 24, and protruding connector portions 17A, 18A (which may be substantially pointed) (shown in EXTENDED position in FIG. 15A) which are mounted in solenoids 19, which optionally may be operable only when the car is stationary or moving at a very slow speed. The connector portions 17A,18A may be magnetized to facilitate attachment to the metallic portions of receptacles 15A and 16A. The portion 14A may also be movably mounted on springs 24 to provide for adjustment.

FIG. 15A is a schematic illustration showing a close-up view of a preferred embodiment assembly of the present invention comprising a car bumper section or portion 14 or 14A, support, receptacle portions 15A, 16A movably mounted on springs 24, and protruding connector portions 17A, 18A (which may be pointed) (shown in EXTENDED position in FIG. 15A) which are mounted in solenoids 19, which optionally may be operable only when the car is stationary or moving at a very slow speed. The connector portions 17A,18A may be magnetized to facilitate attachment to the metallic portions of receptacles 15A and 16A. The portion 14A may also be movably mounted on springs 24 to provide for adjustment. The supports 30 may be attached to a wall, post or support 10. Spring 24 allow the receptacles to move vertically. Naturally, if the receptacles 15a, 16A were spaced horizontally, the springs could be mounted to facilitate horizontal movement without departing from the spirit of the invention. Guides 29 are contacted by the housing 14, 14A associated with the vehicle and force the receptacles 15A, 16a up and down to facilitate entry of the protruding portions 17A, 18A into the receptacles 15A, 16a.

FIG. 15B is a close up schematic view of the spring mounted receptacles 15A, 16A comprising a cover (such as for example, a rubber surround) having slits or openings into which the connectors 17A, 18A may be inserted. The configuration of 15A, 16A may be rectangular, as shown in FIG. 15B.

FIG. 16A is a schematic illustration showing a close-up view of a preferred embodiment assembly of the present invention comprising a car bumper section or portion 14 or 14A, support, guides 29, receptacle portions 15A, 16A movably mounted on springs 24, and protruding connector portions 17A, 18A (which may be pointed) (shown in EXTENDED position in FIG. 15A) which are mounted in solenoids 19, which optionally may be operable only when the car is stationary or moving at a very slow speed. The connector portions 17A,18A may be magnetized to facilitate attachment to the metallic portions of receptacles 15A and 16A. The portion 14A may also be movably mounted on springs 24 to provide for adjustment. As the support housing 14, 14A engages the guides 29, the receptacles 15A, 16a are driven up and down to facilitate alignment and entry of the protruding portions 17A, 18A into the receptacles 15A, 16A. Alternately, the housing portion 14, 14A can be spring supported as in FIG. 12A to further facilitate alignment and entry of the protruding portions 17A, 18A into the receptacles 15A, 16A.

FIG. 16B is a close up schematic view of the spring mounted receptacles 15A, 16A comprising a cover (such as for example, a rubber surround) having slits or openings into which the connectors 17A, 18A may be inserted. The configuration of 15A, 16A may be rectangular, as shown in FIG. 16B.

Regarding horizontal alignment, FIG. 17 is a schematic illustration showing a top view of a preferred embodiment assembly of the present invention comprising a car bumper section or housing portion 14 or 14A, support, guides 29, receptacle portion (either 15A or 16A) movably mounted on springs 24, and protruding connector portion (17A or 18A) (which may be pointed) (shown in EXTENDED position in FIG. 15A) which are mounted in solenoids 19, which optionally may be operable only when the car is stationary or moving at a very slow speed. The connector portions 17A or 18A may be magnetized to facilitate attachment to the metallic portions of receptacles 15A and 16A. The portion 14A may also be movably mounted on springs 24 to provide for adjustment. As the housing 14A engages the guides, which may be metal or plastic, the receptacle (15A or 16A) is moved horizontally to allow for proper alignment of the protruding portion 17A with the receptacle 15A, 16A.

FIG. 18 is a schematic illustration showing a top view of a preferred embodiment assembly of the present invention comprising a car bumper section or portion 14 or 14A, support, guides 29A, receptacle portion (either 15A or 16A) movably mounted on springs 24, and protruding connector portion (17A or 18A) (which may be pointed) (shown in EXTENDED position in FIG. 15A) which are mounted in solenoids 19. The portion 14A may also be movably mounted on springs 24 to provide for adjustment. The guides 29A also operate as negative charge carrying connectors which contact a metallic surface of vehicle which is grounded to complete the negative portion of the charging circuit. Moreover, the second connector may be dispensed with if the guides 29 engage a metallic surface of the vehicle which is grounded to the negative pole of the battery, for example, a chrome bumper grounded to the vehicle chassis. The first connector would connect to the positive terminal of the vehicle battery.

FIG. 19 is a close-up schematic view of a receptacle 15A or 16A, further showing tightly strung wires for holding the protruding connectors in position. The protruding contact 17A or 18A would enter between the wires and be held in place by the tightly strung wires. Springs 21 allow movement in both the horizontal and vertical directions.

FIG. 20A is a close-up schematic view of a receptacle 15A or 16A, further showing a cavity receptacle for holding the protruding connectors 17B, 18B in position. As the protruding connector 18A enters the receptacle it pushes against the rear wall of the receptacle. The pivoting wall 45, which is spring biased, engages the notch on the protruding connector 17B, 18B to hold it in place during charging of the car battery. The pivoting wall may comprise a plurality of walls or be circumferential to securely retain the protruding connector 17B.

FIG. 20B is a close-up schematic view of a modified receptacle 15A or 16A, further showing a cavity receptacle for holding the protruding connectors 17A, 17B in position and further comprising a sensor which actuates a spring release such that the sidewall prevents the protruding connector from inadvertent release as it locks it into place.

FIG. 21A is a close-up schematic view of a modified receptacle 15A or 16A, further showing a cavity receptacle for holding the protruding connectors 17A, 18A in position and further comprising a reduced section 41 and electromagnets/sensors which prevents the protruding connector from inadvertent release as it is held in place.

FIG. 22 is schematic illustration of a car having a solar collector on the roof. This provides an effective way of recharging the vehicle battery while the vehicle is in motion.

FIG. 23 is schematic illustration of a car having a solar collector on the roof and front and rear windows. This configuration provides an effective way of recharging the vehicle battery while the vehicle is not in motion. Moreover, the solar collector rear window cover keeps the car cooler and/or prevents sunlight from entering the interior of the car.

FIG. 24 is schematic illustration of a car having a solar collector on the roof and front and rear windows; further comprising hinges between sections for folding as illustrated. The assembly may fold into the top/roof of the car or may be removed to storage.

FIG. 25 is a side view of a preferred embodiment of the present invention. The assembly shown in FIG. 25 is a preferred embodiment assembly 50A comprising solar panel support surface 52S, LED support 53, central portion 54, cover 55, wind direction detector 57, and motor/generator 59. It can be readily appreciated by those of ordinary skill in the art that the solar support surface 52 may comprise one or a plurality of panels 52S and may take a variety of forms, such as circles, squares, rectangles or arcuate sections. The solar panels 52 may range in dimensions from 1 inch by one inch to two square feet depending on the application, power requirements, and resources available. The LED support 53 is shown as a "disk" but can be any configuration or form. LED support 53 supports LED 3L; which may be a plurality of up to 50 depending on the intensity desired. Moreover, the selection of LEDs 53L is exemplary and any type of light may be used without departing from the scope of the invention. The function of the solar support 52 and LED support 53 may be combined and a single support may perform both functions. Additionally, the solar support 52 and LED support 53 as well as solar diodes 52S and LEDs 53L may be one integral unit. Inasmuch as both LEDs 53L and photodiodes 52S comprise substrates, a preferred embodiment utilizes the same substrate for both the photodiode and LEDs, as described further in U.S. Pat. No. 7,789,524. In this regard, the LEDs 53L may be formed using, for example, a sapphire substrate. The same substrate may be used for the photodiode configuration. By doing so, the assembly weight and material requirements are reduced. Moreover, an integral unit comprising the solar support 52 and LED support 53 provides for ease of assembly and greater strength and durability.

Assembly 50 further comprises vanes 56 mounted on the support 53. The vanes may be plastic or aluminum or any material which provides a light weight, durable, rigid construction. The vanes cause the support 53 to turn in response to the force of the wind. Wind screen 55 is substantially semicircular in configuration and shields one side of the LED support 53 while the other side is subjected to the wind. Wind screen 55 is rotatably mounted and is controlled by central vane 57 which responds to wind direction. In addition, LED support 53 is operatively attached to central portion 54 so as to rotate as motor/generator 59 turns, as will be described later.

As shown in FIG. 26, the wind screen covers half of the vanes 56 so that the force applied by the wind to the vanes cases them to turn in a single direction. Other configurations which achieve this result are contemplated within the scope of the invention. The wind screen is substantially clear so as to allow the sun rays to penetrate to the solar panels 52.

Shown in FIG. 27 is a preferred embodiment in which the vanes 56 are positioned between the solar panels 52 and LED support 53. This configuration effectively channels the wind between the solar panels 52 and LED structure. The wind dissipates the heat energy given off by the LEDs so as to facilitate cooling or temperature control. In the absence of wind, the vanes 56 may be turned by motor 59 to facilitate cooling. FIG. 27 further shows a side view of the LED support 53, photodiodes or solar panels 52, wind screen or cover 55 and wind directional vane 57, Wind directional vane 57 operates in a manner similar to a weather vane in that it points in the wind direction. Wind directional vane 57 may be a variety of configurations The directional vane 57 and wind screen form an integral unit and are designed so the weight is evenly distributed each side of the axis of rotation, but the pointer can move freely on its axis. The area of the directional vane 57 is distributed so that the side with the larger area is blown away from the wind direction. The optional directional pointer may be mounted such that is always on the smaller side. For the wind direction reading to be accurate, the directional vane must be located well above the ground and away from buildings, trees, and other objects which interfere with the true wind direction. But the same is not necessary for the basic functioning of the assembly 50B.

Shown in FIG. 28 is a plan view of a preferred embodiment of the present invention. As shown in FIG. 28, for a prevailing wind direction from right to left (as shown in the Figure) the wind direction detector 57 would point to the left and the cover 5 would cover half of the vanes 56 so that the support 52 and the support 53 would turn in a counterclockwise direction on central portion 54. Central portion 54 may be a shaft which is operatively connected to shaft 61 and motor/generator 59. Although four vanes (or eight vane segments are shown in FIG. 28, any number of vanes could be used to enable the wind to propel or rotate the subassembly.

FIG. 29 is a schematic side view of a preferred embodiment of the present invention in which assembly 50C comprises support 53, solar panels 52, cover 55, and wind direction vane 57. Motor-generator 59 is pivotally mounted by supports 64. Each of supports 64 are attached to a pivot or shaft or pivot 65. Shaft or pivot 65 is in turn driven by a motor inside housing 62 (as described further in U.S. Pat. No. 7,789,524) which causes the entire assembly 50C to pivot as shown in FIG. 29. As a result the solar support 52 and elements 52S on the assembly 50C can track the sun as it rises in the east and sets in the west. For example, a motor 66 slowly turns the pulley which drives the belt resulting in the angular disposition of the elements 52S.

FIG. 30 is a schematic diagram showing a device 69 for regulating the voltage, controlling the charge into, and/or current from the battery 63 which also may optionally function as an on/off switch which prevents overcharging of the battery 63 and/or effectively removes battery 63 from the circuit 70A. Motor generator 59 operates to recharge battery 63 when in the generator mode and when a low battery indicator 73 indicates the need for a charge. The motor/generator 9 is optional in that the solar diodes may optionally be the sole means for recharging the battery 63. Also, when the motor/generator 59 is operating in the circuit 70A, in cases where the wind is causing the rotation of the vanes 56, the battery may be bypassed using device 69 to disconnect the battery from the circuitry entirely. Similarly, a device 69A may optionally be position in series with the motor/generator 59 to disconnect it from the circuitry when desired. As a further option, devices 69 and 69A may be combined into a combined voltage regulator, charge controller and/or charge level indicator. When the battery is determined to be low, (from optional low battery indicator 73 or the function could be incorporated into the power controller/regulator 69) the contacts 58A, 58B may be positioned such that the contacts are only intermittently connected to create a strobe-like effect for the activation of the LEDs 53L. Similarly, temperature sensor 72 may be operatively connected to the contacts 58A, 58B shorten the contact duration through contacts 58A, 58B or optionally may operate to open the optional switch 66L to prevent over heating of the LEDs 53L, and/or activate motor/generator 59 to rotate the support 53 to create a cooling effect. Moreover, alternatively the light detector 75 (such as commonly used part 2N3904) may operate to turns the LEDs on and off at daylight and dusk either by sensing the intensity of light from the sun and/or environment or by a timer which turns the LED on and off at specified times and also be responsive to the temperature sensor.

FIG. 31 is a schematic diagram showing circuitry 70B comprising an optional controller 71, with control lines represented by dashed lines. Controller 71 may be a microprocessor, programmable controller, processor, programmable chip device, computer, microcomputer, controller or the like. Controller 71 may receive control signals from the low battery indicator 73 and, in turn, regulate the contacts 58A, 58B such that the contacts are only intermittently connected to create a strobe-like effect for the activation of LEDs 53L. Similarly, if temperature sensor 72 sends a high temperature control signal to the controller 71, controller 71 may send control signals via the control lines to any one of or in tandem open the optional switch 66L to prevent over heating of the LED, activate motor/generator 59 to rotate the support 53 to create a cooling effect, and/or shorten the contact duration through contacts 58A, 58B. Moreover, alternatively controller 71 may have a light detector which turns the LED on and off at daylight and dusk either by sensing the intensity of light from the sun and/or environment or by a timer which turns the LED on and off at specified times. Moreover the controller 71 may be a programmable controller includes a feedback routine for measuring the intensities of the LEDs 53L and using the actual intensities as feedback. Optionally, the controller may cause the LEDs 53L to be supplied with approximately 50% of said maximum current capacity or some fraction thereof to either conserve power or reduce the temperature of the LEDs. Optionally, the programmable controller may operate to adjust the intensity, with the programmable controller including an intensity compensation routine for adjusting the intensity of the LED, based on the intensity as detected by feedback means.

As used herein, the terminology "without operator handling" means, in the case of the protruding portions entering the receptacles, that allow the operator may be controlling the positioning of the car, the location of the protruding contact portions is determined by the positioning of the car and the operator need not disembark from the car. At the same time, the assembly may be removably positioned on the periphery of the vehicle by the operator without departing from the scope of the invention.

As used herein the terminology "external" means external to the vehicle.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

The invention claimed is:

1. An assembly for connecting a vehicle to a charging source comprising:
a housing removably mounted to the vehicle exterior;
at least one retractable protrusion operatively connected to a battery terminal of the vehicle;
the at least one retractable protrusion being mounted within the housing;
the at least one retractable protrusion adapted to be connected to at least one receptacle operatively connected to the charging source for electrical connection of a vehicle to the charging source;
the charging source comprising a parking meter, at least one solar panel and at least one storage battery in close proximity to the solar panel for storage of electricity from the at least one solar panel, the parking meter comprising a parking meter support which is positioned in the ground, the at least one solar panel having a panel support for supporting the at least one solar panel above the parking meter, the panel support being operatively connected to the parking meter and/or the parking meter support; electricity generated by the at least one solar panel operating to charge the at least one storage battery, the parking meter comprising a meter for monitoring the flow of electricity from the storage battery, and electricity being dispensed from the storage battery upon payment of a fee into the parking meter;
whereby by driving the vehicle in the proximity of the at least one receptacle, the charging source is connected to the electrical system of the vehicle as the retractable protrusion engages the at least one receptacle thereby allowing electricity from the storage battery to recharge the vehicle.

2. The assembly of claim 1 wherein the at least one retractable protrusion comprises an electrode movably mounted centrally within a solenoid mounted within the housing, the solenoid operating to propel the electrode into the at least one receptacle, and wherein the housing is movably attached to the vehicle and wherein the at least one receptacle has guides associated therewith for guiding the housing into alignment with the at least one receptacle.

3. The assembly of claim 1 wherein the lower portion of the housing is adapted to engage a ramped portion associated with the at least one receptacle; whereby the ramp portion causes the housing to align vertically with the at least one receptacle.

4. The assembly of claim 3 wherein the housing is mounted to the vehicle by at least one spring and as the bottom of the housing engages the ramp, the springs permit the housing to align with the surface of the ramp.

5. The assembly of claim 3 wherein the housing has at least one rotating element operatively associated therewith which engages the ramp portion.

6. The assembly of claim 5 wherein the rotating element is a wheel or roller.

7. The assembly of claim 1 further comprising at least one wind vane operatively associated with the at least one solar panel.

8. The assembly of claim 1 wherein the storage battery is positioned behind the at least one solar panel and wherein, the solar panel has a wind vane associated therewith, the wind vane operating to generate electricity in a first mode and to provide a cooling effect in a second mode.

9. The assembly of claim 1 wherein as the vehicle moves forward the housing is adjustably mounted by springs which adjust the position of the housing and the at least one retractable protrusion so that the at least one retractable protrusion is aligned for entry into the receptacle; the housing being mechanically adjusted by a plurality of guides mounted adjacent to the at least one receptacle; the adjustment of the housing relative to the at least one receptacle occurring without operator intervention.

10. The assembly of claim 9 wherein the plurality of guides operable in both the horizontal and vertical directions to guide the housing into alignment with the at least one receptacle, the guides being biased by a plurality of springs.

11. The assembly of claim 1 wherein the insertion of the at least one retractable protrusion into the at least one receptacle is laser guided.

12. The assembly of claim 1 further including feedback means for determining whether the at least one retractable protrusion is adequately inserted into the at least on receptacle.

13. The assembly of claim 1 wherein the charging source comprises at least one wind vane operative associated with the at least one solar panel for generating electricity in a first mode and for cooling the solar panel in a second mode.

14. The assembly of claim 13 wherein further comprising a motor generator and a shaft operatively connected thereto, the at least one wind vane and the at least one solar panel being mounted on the shaft for rotation thereof; the motor generator operating to rotate the wind vane and at least one solar panel in a first mode to provide a cooling effect and the at least one wind vane operating to turn the shaft in response to the flow of wind to generate electricity in the second mode.

15. An assembly for connecting a vehicle to a charging source comprising:
a housing removably mounted to the vehicle exterior;
at least one retractable protrusion operatively connected to a battery terminal of the vehicle; the at least one retractable protrusion being mounted within the housing;
the at least one retractable protrusion adapted to be connected to at least one receptacle operatively connected to the charging source for electrical connection of a vehicle to the charging source;
the charging source comprising a parking meter, at least one solar panel, at least one wind vane, at least one motor generator, and at least one storage battery in close proximity to the solar panel for storage of electricity from the at least one solar panel and the at least one wind vane, the parking meter comprising a parking meter support which is positioned in the ground, the at least one solar panel and the at least one wind vane being mounted on a shaft for rotation thereof, the shaft being operatively associated with a motor generator, the charging source being operatively connected to the parking meter and/or the parking meter support; electricity generated by the at least one solar panel and the at least one wind vane operating to charge the at least one storage battery, the parking meter comprising a meter for monitoring the flow of electricity from the storage battery, and electricity being dispensed from the storage battery upon payment of a fee into the parking meter;
whereby by driving the vehicle in the proximity of the at least one receptacle, the charging source is connected to the electrical system of the vehicle as the retractable protrusion engages the at least one receptacle thereby allowing electricity from the storage battery to recharge the vehicle.

16. An external vehicle charging system comprising:
at least one parking meter next to a parking space in a street, into which a vehicle operator pays a fee to purchase time so as to he authorized to park a vehicle for a length of time,
at least one solar element for converting solar power to electric power;
at least one wind vane for converting wind power to electric power; the wind vane being operatively associated with a generator which generates electricity in response to the turning of the wind vane,
at least one battery operatively associated with the at least one parking meter for storing electricity generated by the solar element and wind vane;
the solar element and the generator being operatively connected to the at least one battery for storing electric power therein;
first and second external connectors operatively associated with the at least one battery, the first and second external connectors adapted to be connected to first and second vehicle based connectors operatively associated with the vehicle charging system for connecting the vehicle power supply to the vehicle charging system while the vehicle is parked in the parking space, the first and second vehicle connectors being mounted within a removable housing on the vehicle, the removable housing being adjustable mounted to the vehicle; whereby upon payment of a fee into the parking meter, the external vehicle charging system is activated to enable the charging of the vehicle battery system using solar and wind power.

17. The system of claim 16 wherein the vehicle is one of an electric car, truck or bus, and wherein the first and second vehicle based connectors are located on the periphery of the vehicle within the removable housing such that the vehicle may be connected to the vehicle charging system by alignment of the vehicle with first and second external connectors operatively associated with the external charging system; whereby by maneuvering the vehicle, the first and second vehicle based connectors are bought into contact with the first and second external connectors to enable charging of the vehicle battery.

18. The system of claim 16 wherein the at least one parking meter comprises a central portion comprising a meter for measurement of electricity transferred to the vehicle.

19. The system of claim 17 wherein wherein as the vehicle moves forward the removable housing is adjustably mounted by springs which adjust the position of the housing and the at least one retractable protrusion so that the at least one retractable protrusion is aligned for entry into the receptacle; the housing being mechanically adjusted by a plurality of guides mounted adjacent to the at least one receptacle; the adjustment of the housing relative to the at least one receptacle occurring without operator intervention.

20. The system of claim 17 wherein the storage battery is positioned behind the at least one solar panel and wherein the solar panel and the at least one wind vane revolve together, the at least one wind vane operating to generate electricity in a first mode and to provide a cooling effect in a second mode.

* * * * *